(12) United States Patent
Weston-Dawkes et al.

(10) Patent No.: US 7,986,881 B2
(45) Date of Patent: *Jul. 26, 2011

(54) OPTICAL TRANSMISSION SYSTEMS, DEVICES, AND METHODS

(75) Inventors: Jonathan L. Weston-Dawkes, Ellicott City, MD (US); Stefano Baroni, Chevy Chase, MD (US); Marian Trnkus, Chevy Chase, MD (US); Lotfi M. Benmohamed, Clarksville, MD (US); Jean-Luc Ronarc'h, Calabasas, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/581,190

(22) Filed: Oct. 19, 2009

(65) Prior Publication Data
US 2010/0129078 A1 May 27, 2010

Related U.S. Application Data

(63) Continuation of application No. 10/454,438, filed on Jun. 4, 2003, now Pat. No. 7,606,494.

(60) Provisional application No. 60/385,758, filed on Jun. 4, 2002.

(51) Int. Cl.
H04J 14/02 (2006.01)
(52) U.S. Cl. .............................. 398/83; 398/48
(58) Field of Classification Search ............... 398/83–85
See application file for complete search history.

(56) References Cited

U.S. PATENT DOCUMENTS

| | | | |
|---|---|---|---|
| 5,457,556 A | 10/1995 | Shiragaki | |
| 5,751,454 A * | 5/1998 | MacDonald et al. | ........... 398/59 |
| 6,118,566 A | 9/2000 | Price | |
| 6,344,922 B1 | 2/2002 | Grubb et al. | |
| 6,449,073 B1 | 9/2002 | Huber | |
| 2001/0024305 A1 | 9/2001 | Nishimoto | |
| 2002/0093711 A1 | 7/2002 | Simmons et al. | |
| 2002/0105703 A1 | 8/2002 | Grubb et al. | |
| 2002/0186432 A1 | 12/2002 | Roorda et al. | |
| 2002/0186434 A1 | 12/2002 | Roorda et al. | |
| 2004/0052520 A1* | 3/2004 | Halgren et al. | .................... 398/5 |
| 2006/0228114 A1* | 10/2006 | Caroli | ............................ 398/83 |
| 2007/0104489 A1 | 5/2007 | Jaggi et al. | |

FOREIGN PATENT DOCUMENTS
WO 0154425 A2 7/2001

OTHER PUBLICATIONS

Weston-Dawkes, "ULH Optimizing Grooming in Optical Mesh Network", OFC 2002, Mar. 17-21, 2002, pp. 784-786.
Lipes, "Understanding the Trade Offs Associated with Sharing Protection", OFC 2002, Mar. 17-21, 2002, pp. 786-787.

\* cited by examiner

*Primary Examiner* — Leslie Pascal

(57) ABSTRACT

Optical communications systems including grooming, protection, restoration, and migration on a unified network platform, and using a unified control plane. The systems may include combinations of optical bypass and mesh restoration, may include combinations of shared mesh and dedicate protection, and may be combinations of long haul, extended long haul, and ultra long haul systems. The systems may also include a configurable DWDM tier to accommodate dynamic traffic patterns, thereby allowing for increased operational flexibility.

9 Claims, 20 Drawing Sheets

OPTICAL TRANSMISSION SYSTEMS, DEVICES, AND METHODS

CROSS-REFERENCE TO RELATED APPLICATIONS

This application is a continuation of U.S. patent application Ser. No. 10/454,438, filed Jun. 4, 2003, which claims priority from U.S. Provisional Patent Application No. 60/385,758, filed Jun. 4, 2002, both of which are incorporated herein by reference.

STATEMENT REGARDING FEDERALLY SPONSORED RESEARCH OR DEVELOPMENT

Not Applicable.

BACKGROUND OF THE INVENTION

The development of digital technology provided the ability to store and process vast amounts of information. While this development greatly increased information processing capabilities, it was soon recognized that in order to make effective use of information resources it was necessary to interconnect and allow communication between information resources. Efficient access to information resources requires the continued development of information transmission systems to facilitate the sharing of information between resources. One effort to achieve higher transmission capacities has focused on the development of optical transmission systems. Optical transmission systems can provide high capacity, low cost, low error rate transmission of information over long distances.

The transmission of information over optical systems is typically performed by imparting the information in some manner onto an optical signal. In most optical transmission systems the information is imparted by using an electrical data stream either to directly modulate an optical source or to externally modulate an optical carrier so that the information is carried at the frequency of the optical carrier, or to modulate the information onto one or more subcarriers or sidebands, with the later technique sometimes called sub-carrier modulation ("SCM").

Many variations of optical systems or networks are possible, including all-optical networks, point-to-point networks, other types of networks, and combinations thereof. Optical cross connects (OXC) may be used to multiplex traffic entering the network, and may be used for the intermediate grooming of traffic as it travels through the network. With point-to-point transmission architectures, where traffic is dropped or regenerated at every node, grooming adds only a relatively small additional cost at the node, and hence intermediate grooming can be performed as needed to maintain high channel utilization. In longer haul transmission architectures such as all-optical networks, extended long haul systems, and ultra-long haul systems, however, channels can pass through a node without transponders or regenerators, and the cost of grooming includes both OXC interfaces and WDM transponders.

Traditional mesh restoration designs attempt to minimize the spare bandwidth required for 100% recovery of the traffic from any single cable cut. With short optical reach, the cost of such designs is close to optimal. Maximizing bandwidth efficiency results in the assignment of spare bandwidth to short, highly shared links. However, this practice does not use ULH technology effectively.

In addition, the amount of broadband services (e.g., IP, private lines, . . . ) being deployed within core networks is large and ever increasing. Most of these services require sub-wavelength connectivity (e.g., OC-3/STM-1, OC-12/STM-4, . . . ) between network end-points, leading to the need for efficient grooming architectures supporting low-cost, efficient transport. Several alternative grooming architectures exist. Each provides different levels of network efficiency and cost. The different architectures offer significantly different performances when traffic growth and scalability is considered optical systems 10 may utilize different grooming architectures.

Furthermore, in an environment where capital and operational expenses are constrained by strong competitive pressures, the control plane becomes a critical component of the next-generation transport network. By automating provisioning operations, it reduces operational expenses. By automating traffic engineering, the control plane allows for maximizing revenue over deployed network resources. In particular, we show that for a given deployment network capacity, a larger set of traffic demands can be accommodated when allowing for dynamic reconfigurability, rather than using a static configuration. The Control Plane also holds the promise of generating additional revenues through next-generation services such as Bandwidth-on-Demand (BoD) and Optical Virtual Private Networks (OVPN).

Accordingly, there is a need for more efficient grooming, protection, restoration, and migration in modern networks, as well as a need for networks that are more flexible and more easily reconfigured to meet changing demands.

BRIEF DESCRIPTION OF THE DRAWINGS

Embodiments of the present invention will now be described, by way of example only, with reference to the accompanying drawings for the purpose of illustrating embodiments only and not for purposes of limiting the same, wherein.

BRIEF SUMMARY OF INVENTION

Figure 1:
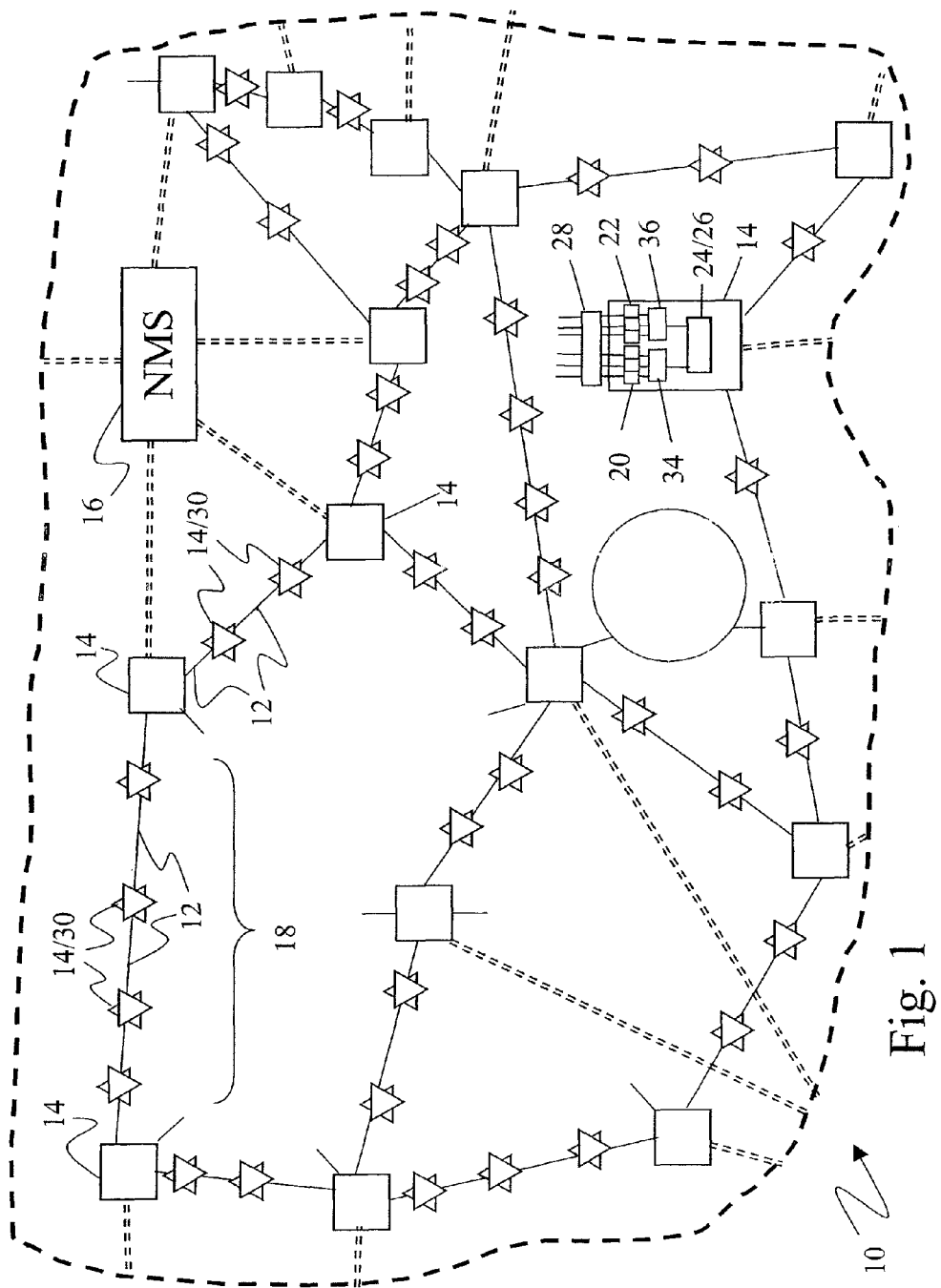
FIGS. 1 and 2 illustrate examples optical communications systems.

The present invention is directed generally to improved optical communications systems, devices, and methods which may include grooming, protection, restoration, and migration on a unified network platform, and which may use a unified control plane. The systems may include combinations of optical bypass and mesh restoration, may include combinations of shared mesh, dedicate protection, or other protection, and may be combinations of long haul, extended long haul, and ultra long haul systems. The systems may also include a configurable DWDM tier to accommodate dynamic traffic patterns, thereby allowing for increased operational flexibility. The present invention enables efficient, low cost optical communications systems, devices, and methods.

One embodiment of the present invention is directed to systems including new network elements or nodes that combine the cost efficiency of optical by-pass and the flexibility and fine granularity of a grooming cross-connect, referred to as the "unified network platform". A strong interaction between the grooming cross-connect layer and the dynamic DWDM layer provides increased flexibility in order to accommodate traffic changes or uncertainties in traffic demands.

Another embodiment of the present invention is directed to grooming architectures which support a smooth transition from low traffic levels, where traffic may be groomed at several nodes along its route, to high traffic levels where intermediate grooming is not required and optical bypass dramatically decreases the cost of the network.

Another embodiment of the present invention is directed to the protection and restoration of traffic on the unified network platform. Optical bypass can reduce the cost of mesh restoration networks without a significant loss of efficiency, and enable the cost-saving application of ULH. Moreover, dedicated protection can be used to provide additional optical bypass and cost reduction, which combined with mesh restoration results in network cost significantly lower than mesh restoration or dedicated protection alone. OXCs and optical bypass can thus protect traffic with a flexible restoration architecture that supports both shared mesh and dedicated protection, choosing the percentage of traffic assigned to each according to service, efficiency, and cost requirements.

Another embodiment of the present invention is directed to grooming and mesh restoration architectures that support increased use of optical bypass. In particular, to optimize the protection/restoration of optical demands based on the optical reach of the underlying transmission technology. With ELH transmission, a hybrid shared mesh/dedicated protection architecture was found to be clearly superior to either 100% shared mesh or 100% dedicated protection. The optimal amount of dedicated protection increases as the optical reach is increased. With ULH, there is great flexibility in choosing the amount of dedicated protection used.

Another embodiment of the present invention is directed to architecture and key components of a unified control plane. In addition, it includes the benefits of a configurable DWDM tier to accommodate dynamic traffic patterns. In particular, for a given deployed network capacity, a larger set of traffic demands can be accommodated when allowing for reconfigurability than when using one static configuration.

Another embodiment of the present invention is directed to the unified control plane architecture and the building blocks required to manage a unified network platform to realize the strong interaction between tiers and efficient management of connections. The unified control plane of the present invention allows for tolerance to traffic changes or traffic forecast uncertainty. A unified control plane will also reap the benefits of a unified control plane by managing two network tiers through the same scheme, enabling end-to-end, single-step service provisioning. The present invention also provides a significant operational expense savings. The unified control plane can facilitate next generation services such as Bandwidth on Demand and Optical Virtual Private Networks.

Those and other embodiments of the present invention will be described in the following detailed description. The present invention addresses the needs described above in the description of the background of the invention by providing improved systems, apparatuses, and methods. These advantages and others will become apparent from the following description of the invention.

DESCRIPTION OF THE INVENTION

FIG. 1 illustrates an optical communications system 10 which includes optical paths 12 connecting nodes and network elements 14. Advantages of the present invention can be realized with many system 10 configurations and architectures, such as an all optical network, one or more point to point links, one or more rings, a mesh, other architectures, or combinations of architectures. The system 10 illustrated in FIG. 1 is a multi-dimensional network, which can be implemented, for example, as an all optical mesh network, as a collection of point to point links, or as a combination of architectures. The system 10 can employ various signal formats, and can also convert between formats. The system 10 can also include more or less features than those illustrated herein, such as by including or deleting a network management system ("NMS") 16 and changing the number, location, content, configuration, and connection of nodes 14.

The optical paths 12 can include guided and unguided transmission media, such as one or more optical fibers, ribbon fibers, planar devices, and free space devices, and can interconnect the nodes 14 providing optical communication paths through the system 10. Various types of transmission media can be used, such as dispersion shifted fiber ("DSF"), non-dispersion shifted fiber ("NDSF"), non-zero dispersion shifted fiber ("NZDSF"), dispersion compensating fiber ("DCF"), polarization maintaining fiber ("PMF"), single mode fiber ("SMF"), multimode fiber ("MMF"), other types of transmission media, and combinations of transmission media. Furthermore, the transmission media can be doped, such as with erbium, germanium, neodymium, praseodymium, ytterbium, other rare earth elements, other dopants, and mixtures thereof. The paths 12 can carry one or more uni- or bi-directionally propagating optical signal channels or wavelengths. The optical signal channels can be treated individually or as a single group, or they can be organized into two or more wavebands or spectral groups, each containing one or more optical signal channel. The optical signal channels within a spectral group are all treated the same. For example, all optical signal channels in a spectral group are switched in the same manner, and all are dropped at the same locations, even if every optical signal channel in the spectral group is not utilized at every location at which it is dropped. The use of spectral groups to treat groups of channels in the same manner is one way to efficiently manage large numbers of optical signal channels. Examples of forming systems using spectral groups are disclosed in U.S. patent application Ser. No. 10/090,015, filed Feb. 22, 2002, which is incorporated herein by reference. One or more paths 12 can be provided between nodes 14 and can be connected to protection switching devices and/or other redundancy systems. The optical path 12 between adjacent nodes 14 is typically referred to as a link 18, and the optical path 12 between adjacent components along a link 18 is typically referred to as a span.

The nodes and network elements 14 can include one or more signal processing devices including one or more of various optical and/or electrical components. The nodes 14 can perform network functions or processes, such as switching, routing, amplifying, multiplexing, combining, demultiplexing, distributing, or otherwise processing optical signals. For example, nodes 14 can include one or more transmitters 20, receivers 22, switches 24, add/drop multiplexers 26, amplifiers 30, interfacial devices 28, multiplexers/combiners 34, and demultiplexers/distributors 36, as well as filters, dispersion compensating and shifting devices, monitors, couplers, splitters, and other devices. One embodiment of one node 14 is illustrated in FIG. 1, although the nodes 14 can have many other variations and embodiments. Additional examples of nodes 14 are described in U.S. patent application Ser. No. 09/817,478, filed Mar. 26, 2001, and 09/253,819, filed Feb. 19, 1999, both of which are incorporated herein by reference.

The NMS 16 can manage, configure, and control nodes 14 and can include multiple management layers that can be directly and indirectly connected to the nodes 14. The NMS 16 can be directly connected to some nodes 14 via a data communication network (shown in broken lines) and indirectly connected to other nodes 14 via a combination of a directly connected node and communications paths in the optical system 10. The data communication network can, for example, be a dedicated network, a shared network, or a combination thereof. A data communications network utilizing a shared network can include, for example, dial-up connections to the nodes 14 through a public telephone system. The NMS 16 can reside at one or more centralized locations and/or can be distributed among components in the system 10. Mixed data or supervisory channels can be used to provide connections between the network elements of the NMS 16, which can be located in nodes 14 or remote from nodes 14. The supervisory channels can be transmitted within and/or outside the signal wavelength band and on the same medium or a different medium than the wavelength band. Examples of an NMS 16 are described in U.S. Patent Application Ser. No. 60/177,625, filed Jan. 24, 2000, and PCT Patent Application PCT/US01/02320, filed Jan. 24, 2001, both of which are incorporated herein by reference.

The transmitters 20 and receivers 22 are configured respectively to transmit and receive optical signals including one or more information carrying optical signal wavelengths, or channels, via the optical paths 12. The transmitters 20 and receivers 22 can be used in multiple and single channel systems, and can provide varying reach (e.g., short, intermediate, and long reach). The transmitters 20 and receivers 22 can also be part of a device that includes standardized interface transmitters and receivers, such as to support interoperability with other devices and systems, which is particularly useful in WDM applications.

The transmitters 20 include an optical source that provides an optical carrier and can utilize, for example, coherent or incoherent sources, and narrow band or broad band sources, such as distributed feedback ("DFB") sources, distributed Bragg reflection ("DBR") sources, sliced spectrum sources, fiber lasers, semiconductor lasers, light emitting diodes, and other optical sources. The transmitters 20 often include a narrow bandwidth laser as the optical source. The transmitter 20 can impart information onto the optical carrier or onto one or more subcarriers or sidebands. Typically, information is imparted by directly modulating the optical source, by externally modulating the optical carrier, or by modulating the information onto one or more subcarriers or sidebands of the optical carrier, with the later sometimes called sub-carrier modulation ("SCM"). The transmitter 20 may utilize one or more types of modulators, such as electro-optic (e.g., lithium niobate), electro-absorptive, etc.

The receiver 22 can include various detection techniques, such as coherent detection, optical filtering and direct detection, as well as other techniques and combinations thereof. The receiver 22 can include filters, such as fiber Bragg grating filters, bulk grating filters, or other types of filters, or filtering can be performed outside of the receiver 22.

The transmitters 20 and receivers 22 can utilize one or more formats to transmit and receive optical signals. For example, modulation formats such as amplitude modulation, frequency modulation, phase modulation, polarization modulation, power modulation, other modulation formats and combinations of formats, such as quadrature amplitude modulation, can be used. Also, return to zero ("RZ") or non-return to zero ("NRZ") formats can be used with various modulation techniques. Different encoding formats can also be used, such as differential encoding, duobinary encoding, other encoding formats, and combinations thereof. One or more multiplexing formats can be employed, such as space, time, code, frequency, phase, polarization, wavelength, other types, and combinations thereof. The format can also include one or more protocols, such as SONET/SDH, IP, ATM, Digital Wrapper, GMPLS, Fiber Channel, Ethernet, etc. Other signal formats, such as soliton, pulse, chirp, etc, can also be used. Transmitters 20 and receivers 22 can utilize the same format for all channels throughout the system 10, or different formats can be used for different channels and/or in different parts of the system 10, with appropriate format conversion being performed by the transmitters 20 and receivers 22 or by other devices. Examples of optical transmitters 20 are described in U.S. Pat. No. 6,118,566, issued Sep. 12, 2000, which is incorporated herein by reference.

Tunable transmitters 20 and receivers 22 can be used, such as to provide flexibility in the selection of wavelengths used in the system 10. The transmitters 20 and receivers 22 can also include or be associated with other components to perform other signal processing, such as reshaping, retiming, error correction, protocol processing, pre-emphasis, and optical and/or electrical pre- and post-dispersion and distortion compensation. For example, receivers 22 can be connected to the transmitters 20 in back to back configuration as a transponder or regenerator. The regenerator can be deployed as a 1R, 2R, or 3R regenerator, depending upon whether it serves as a repeater (R1: repeat), a remodulator (R2: reshape & repeat), or a full regenerator (R3: reshape, retime, repeat), respectively. The transmitters 20 and receivers 22 in a WDM system can be operated in a uniform manner or the transmission and reception characteristics of the signal channels can be tailored individually and/or in groups.

The switches 24 can take many forms and can have different levels of "granularity". "Granularity" refers to the resolution or precision with which the switching is performed. For example, WDM switches 24 can switch individual wavelengths (also called "channels"), groups of wavelengths, or portions of wavelengths. Before being switched, the signals can be demultiplexed into the appropriate level of granularity, and after being switched the signals can be multiplexed into the desired format, using the same or different modulation formats, wavelengths, or other characteristics.

Switches 24 can have electrical, optical, or electrical/optical switch "fabrics". The switch "fabric" refers to the technology used to perform the switching. Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use micro-electromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in an optically transparent liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. patent application Ser. No. 09/119,562, filed Jul. 21, 1998, which is incorporated herein by reference.

Switches 24 can be grouped into two categories: integrated switches and interfacial switches. Integrated switches allow for optical continuity of signals, while interfacial switches introduce an optical discontinuity which interrupts optical signals with one or more O-E-O conversion, either in the switch itself or in a related component such as a multiplexer 34, demultiplexer 36, or other interface device. In contrast, integrated switches are optically integrated into the system 10 and allow optical signals to continue through the system 10, via the integrated switch 24, without an O-E-O conversion or optical discontinuity. Integrated switches 24 are sometimes called "all-optical switches", "O-O" switches, or "O-O-O" switches. Interfacial switches 24 are a type of interfacial device 28, which is discussed in more detail hereinbelow. Interfacial switches are located within or at the periphery of networks 10 and point to point links 18, such as between two or more point to point links 18, between two or more networks 10, or between a network 10 and a point to point link 18. A switch 24 can have both an integrated switch 24 portion and a interfacial switch 24 portion, such that some signals are switched without an O-E-O conversion, while other signals are subjected to an O-E-O conversion. Switches 24 can have many forms and variations. For example, in addition to being integrated or dedicated, and having an optical and/or electrical switch fabric, a switch 24 can be polarization-sensitive or polarization-insensitive.

Add/drop multiplexers 26 and other devices can function in a manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10 (e.g., systems 10 having integrated switches 24 and integrated add/drop multiplexers 26) are not converted into electrical form until they reach their destination, or until the signals degrade to the point they need to be regenerated before further transmission. Of course, add/drop multiplexers 26 can also be interfacial devices 28.

Interfacial devices 28 generally act as interfaces to and between optical networks 10 and/or point to point links 18. Interfacial devices 28 typically perform at least one optical-to-electrical ("O-E") or electrical-to-optical ("E-O") conversion. In the case of an interfacial switch 24, for example, signals are subjected to an O-E-O conversion before proceeding to the next link 18 or network 10. Interfacial devices 28 can, for example, act as an interface between electrical and optical systems or devices, between different formats, or at other interfaces. Interfacial device 28 can be located within or at the periphery of networks 10, such as between two or more networks 10, between two or more point to point links 18, and between networks 10 and point to point links 18. Interfacial devices 28 can include, for example, cross-connect switches, IP routers, ATM switches, etc., and can have electrical, optical, or a combination of switch fabrics. Interfacial devices 28 can provide interface flexibility and can be configured to receive, convert, and provide information in one or more various formats, protocols, encoding schemes, and bit rates to the transmitters 20, receivers 22, and other devices. The interfacial devices 28 also can be used to provide other functions, such as protection switching.

The optical amplifiers 30 can be used to provide signal gain, such as to overcome attenuation, and can be deployed proximate to other optical components, such as in nodes 14, as well as along the optical communications paths 12. The optical amplifiers 30 can include concentrated/lumped amplification and/or distributed amplification, and can include one or more stages. The optical amplifier can include, for example, doped (e.g. erbium, neodymium, praseodymium, ytterbium, other rare earth elements, other dopants, and mixtures thereof) and/or non-linear interaction amplifiers (e.g., Raman amplifiers, Brillouin amplifiers, etc.), and can be locally and/or remotely pumped with optical energy. The optical amplifiers 30 can also include other types of amplifiers 30, such as semiconductor amplifiers. Two or more amplifiers 30 may be co-located and concatenated to provide additional flexibility.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more serial or parallel stages incorporating various multi-port device and filter combinations to multiplex, demultiplex, and/or broadcast signal wavelengths $\lambda_i$ in the optical systems 10.

Figure 2:
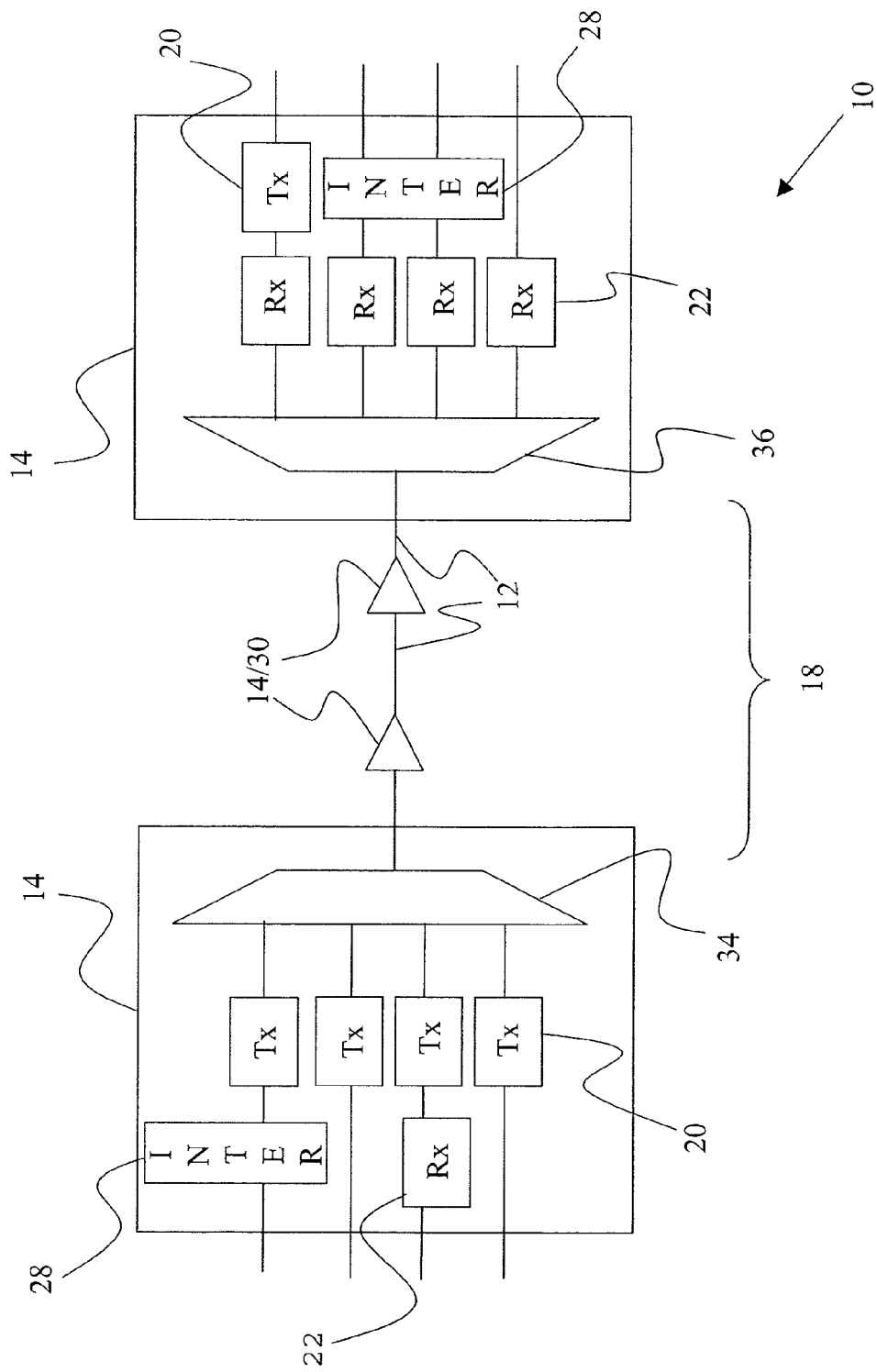

FIG. 2 illustrates another embodiment of the system 10 including a link 18 of four nodes and network elements 14. That link 18 can be, for example, all or part of a point to point system, or it may be part of a multi-dimensional, mesh, or other system. One or more of the nodes or network elements 14 can be connected directly to the network management system 16 (not shown). If the link 18 is part of a larger system, then as few as none of the nodes or network elements 14 can be connected to the network management system 16 and all of the nodes and network elements 14 can still be indirectly connected to the NMS 16 via another node or network element 14 in the larger system 10.

One aspect of the present invention is directed to grooming and improved network 10 restoration for use with optical bypass. Mesh networks 10 based on grooming optical cross connects (OXC) can provide a combination of long-haul (LH), extended long-haul (ELH) and ultra-long haul (ULH) transport functionality together with optical add-drop multiplexers (OADM) and optical switches, to enable traffic to transit through nodes transparently and cost effectively.

Grooming architectures achieve a good balance of network efficiency and cost. A grooming architecture describes a strategy for the location of intermediate grooming site, routing of traffic, and rules for how often traffic is grooming as it traverses the network.

Figure 3:
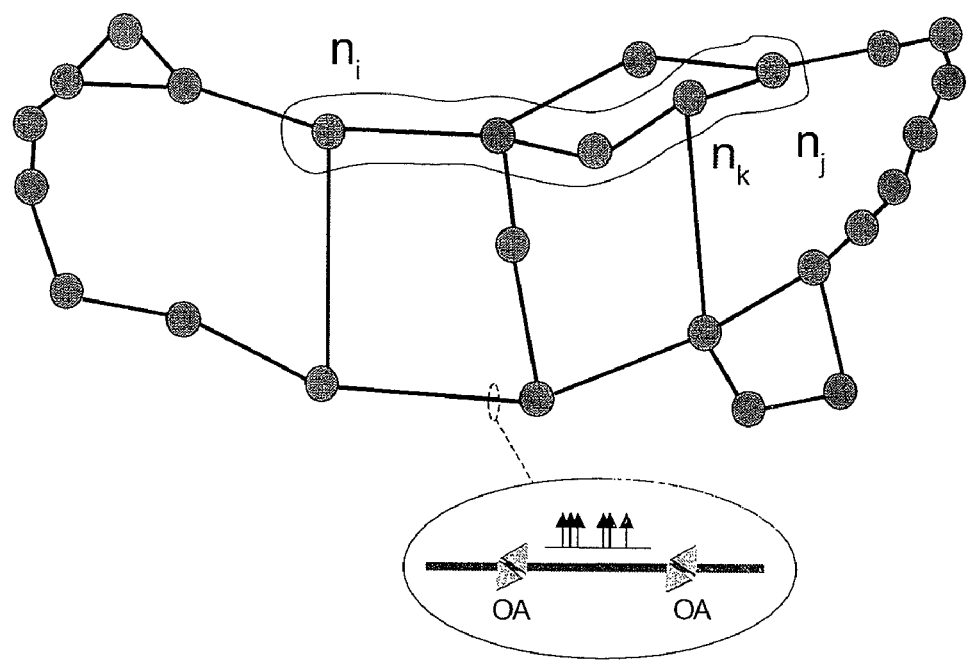
FIG. 3 shows an example of a backbone network.

FIG. 3 illustrates another example of an optical system 10 consisting of N nodes arbitrarily connected by L links. It is assumed that each link consists of a fiber pair, carrying DWDM signals in opposite direction, although other variations are also possible. A number of optical amplifiers (OAs) are deployed on any link, according to its length, fiber type, and hub spacing.

Figure 4:
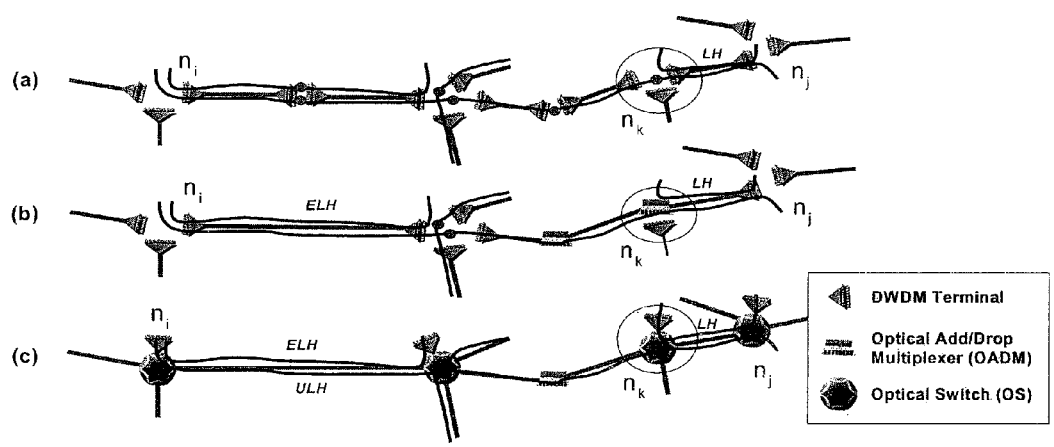
FIG. 4 shows embodiments of optical DWDM transport system alternatives.

Optical DWDM transmission systems that provide different levels of performances are available on the market. One of the key parameters is the maximum optical reach, which has a impact on the network architecture. In this respect, traditional long-haul (LH), extended long-haul (ELH) and ultra long-haul (ULH) systems typically provide reach 400-600 km, 1000-1500 km and 2000-3200 km, respectively. FIG. 4 shows three different ways in which the DWDM transport layer can be engineered along the route from node n, to node $n_j$ in FIG. 3.

FIG. 4(a) depicts the traditional approach where DWDM LH systems are deployed along the route. Circuits that traverse multiple systems need to be regenerated via costly back-to-back OEO transponders or regenerators (e.g. at node $n_k$). Although the introduction of ELH systems with linear optical bypass provided by optical add-drop multiplexers, OADM, (see FIG. 4(b)) may enable to reduce the number of transponders, the most efficient solution is achieved with a flexible unified network platform or system 10 that supports cost effective transport of LH, ELH and ULH applications simultaneously, as shown in FIG. 4(c). A reconfigurable Optical Switch (OS) to provide optical bypass in nodes with degree 3 and higher (The nodal degree is defined as the number of links terminating in a particular node) and ensure transparent optical networking. Another key advantage of the unified network platform is the ability to migrate in service from an LH point-to-point system to a transparent optical architecture, to match the initial carrier needs and its network evolution. The maximum system capacity is also critical and, given the constant traffic growth in the backbone, a system capable of in-service upgrade (e.g., to 40G transport), expansion to multiple bands (e.g., C and L bands) and support of Tb/s transport capacity is desirable.

Each node in the network performs two key functions. For add/drop traffic, the node performs DWDM termination and, for protected/restorable traffic, end-point protection/restoration switching; for low capacity circuits, sub-wavelength multiplexing/grooming can also be performed. For transit traffic, the node performs switching functions to enable end-to-end connectivity and protection/restoration; for low capacity circuits, intermediate grooming can also be performed at the node.

Figure 5:
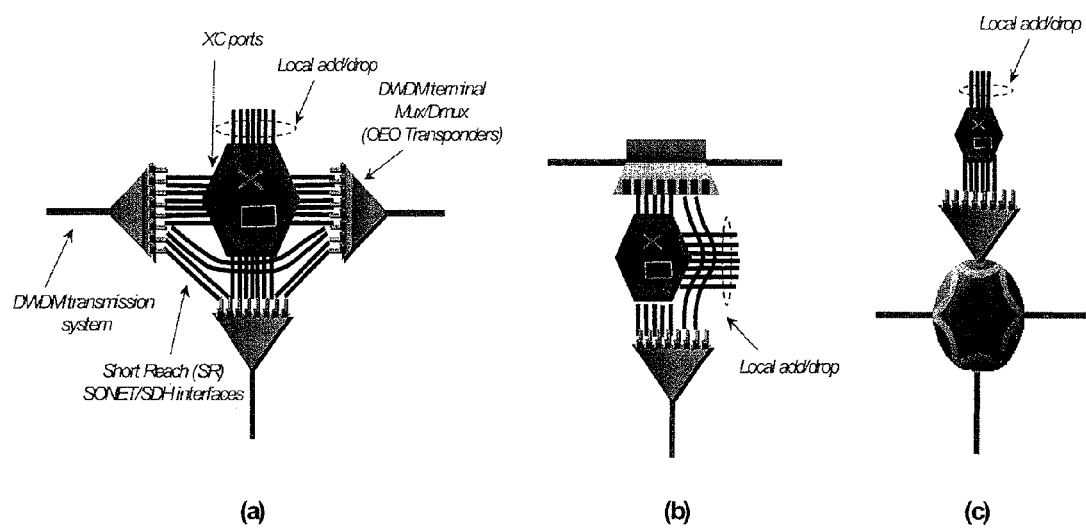
FIG. 5 shows examples of nodal architecture alternatives.

Multiple nodal architecture alternatives exist, which are interrelated to the deployed DWDM transport infrastructure described above. FIG. 5 shows three different ways in which node $n_k$ of FIG. 4 can be implemented.

FIG. 5(a) depicts a node where an electrical SONET/SDH cross-connect (XC) with STS-1 multiplexing/grooming functionalities is deployed between the three DWDM terminal Mux/Dmux. Wavelengths carrying add/drop or transit traffic are typically terminated at the XC to provide grooming and/or switching functionalities. If neither grooming nor switching is required, transit traffic can bypass the XC and statically interconnect between two DWDM terminal Mux/Dmux via patch-panel, with back-to-back OEO transponders or regenerators. Since service reconfigurability requires manual intervention, this backbone configuration provides very limited flexibility and scalability. This is the typical nodal configuration deployed with traditional LH DWDM transmission system (FIG. 4(a)).

As the number of wavelengths bypassing the node in the east-west direction increases, a more cost effective and flexible solution can be achieved by deploying a DWDM transmission system with extended reach in combination with an optical add/drop multiplexer (OADM), as shown in FIG. 5(b). The OADM enables linear optical bypass, eliminating OEO transponders for east-west transit traffic, and ensures traffic add/drop for local distribution, intermediate grooming at the XC and east-south and west-south connectivity. As shown in the figure, however, east-south and west-south circuits still require costly OEO regeneration. This nodal architecture is typically deployed with ELH DWMD transmission systems, and the result is that of a point-to-point architecture (see FIG. 4(b)).

If the amount of transit traffic in the east-south and/or west-south directions is very large, an optical switch (OS) has to be deployed to significantly reduce the number of OEO transponders. In this case, traffic bypasses transparently in all directions, and OEO transponders are required only for traffic that is dropped for local access or grooming in the OXC. The significant advantages of this nodal architecture are achieved in combination with the unified network platform described above, with simultaneous transport of LH, ELH and ULH applications.

Optical systems 10 may utilize different grooming architectures. Full grooming refers to the case where, at each node, all the wavelengths passing through the node are terminated in the OXC and undertake sub-wavelength grooming. No optical bypass is accomplished at any node. This architecture typically consists of point-to-point LH (and, if required, ELH) systems and a grooming OXC at every node, and results in the highest network efficiency, leading to the minimum number of wavelengths being deployed in each link. This architecture is appropriate only for very low traffic levels.

In the express architecture approach; all the traffic is simply multiplexed at the end-points (i.e., source and destination) and no intermediate grooming is carried out. This architecture represents a very cost effective solution when the traffic level between each node pair is sufficiently large to dedicate an entire wavelength. Given the large amount of wavelength bypass generated, this approach is better delivered by the unified network platform where LH, ELH and ULH are offered together with transparent optical networking. Although for small traffic load the express architecture may require a larger number of wavelengths, it may still represent a cost effective solution given the minimal amount of OEO transponders and XC ports. The express architecture minimizes network cost as traffic in the network grows large, so it is desirable for grooming architectures used for low traffic levels to evolve to this architecture over time.

In the regional grooming architecture, a network is divided into multiple regions (or areas) and one grooming node is typically selected to perform gateway functions between any two areas. The size of the regions is usually selected so that one gateway node is used between any two regions. In some cases, however, two or more gateway nodes may be used. In most networks, regions are chosen so that at most two gateway nodes were used between any two regions. The regional grooming architecture was designed to take advantage of the benefits of optical bypass at OADM sites, without the need for bypass at higher degree nodes. Traffic transiting multiple regions must be groomed at opaque gateway nodes, typically at some of the higher degree nodes. Thus, there are no express links that cross multiple areas. The same gateway node(s) may also act as grooming hub(s) for traffic within the region. According to the size of the region, other grooming hubs may be added within the area. Traffic within a region can be groomed at a hub node if required, or connected directly with an express link. Usually this architecture is deployed with point-to-point LH (and, if required, ELH) systems and a grooming XC at every node. Bypass can be achieved either statically via path-panel or with OADM in the case of ELH systems.

First-and-last grooming refers to the case where, for any traffic connection, grooming (if needed) is usually performed at the first and last grooming hubs along the traffic path. If grooming is not needed, an express link is established for the traffic, as shown in FIG. 6.

Figure 6:
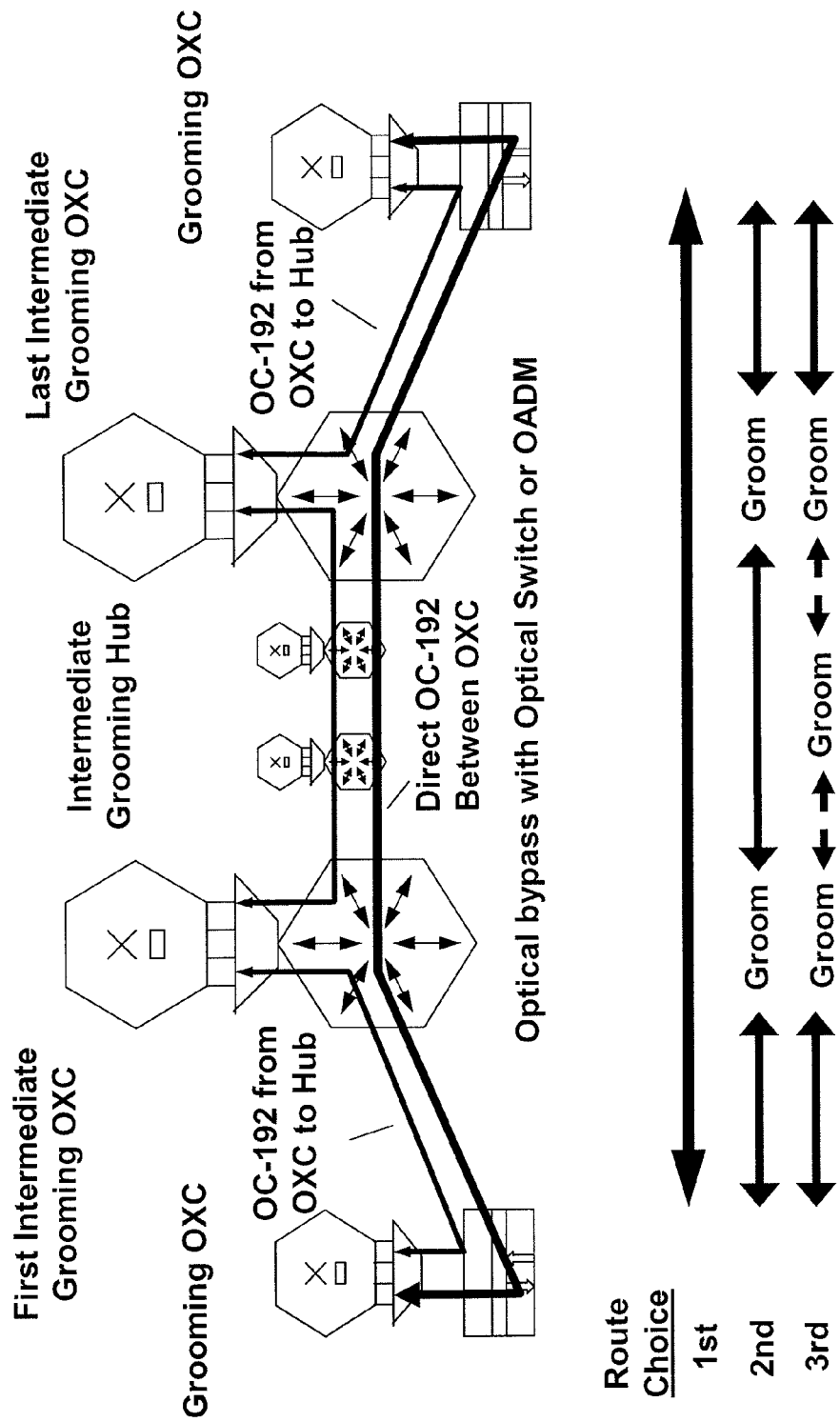
FIG. 6 shows the routing choices in first-and-last grooming architecture.

In this architecture, as shown in FIG. 6, express links can be established between any pair of nodes, not just for nodes in the same area. The advantage of this architecture is the level of flexibility it provides in choosing the intermediate grooming nodes and the bypass nodes, which allows carriers to adapt and optimize the network design for any traffic condition. In voice-centric networks where traffic concentrations are localized, this architecture is similar to regional grooming. In data-centric networks, first-and-last grooming takes full advantage of ELH and ULH technologies for traffic traveling thousands of kilometers.

Mesh restoration with optical bypass offers advantages according to the present invention. Compared with other protection mechanisms, such as SONET/SDH shared protection rings and 1+1 dedicated protection, mesh restoration's values are flexibility and bandwidth efficiency. Maximum bandwidth efficiency is achieved by deploying spare bandwidth on links in an OXC topology identical to the underlying fiber topology. Optical bypass may, depending on the mesh protection mechanism, be used for the working demands. Optical bypass may be undesirable for spare bandwidth, since the use of optical bypass reduces the sharing of spare bandwidth in the mesh. Introducing optical bypass in a mesh restoration architecture can reduce cost. With ULH transmission technology, SONET/SDH shared protection rings or mesh restoration can be replaced by 1+1 dedicated protection with approximately the same network cost, and that the simplicity of this protection architecture outweighs its higher bandwidth use. However, with ELH there are hybrid networks that are lower cost than mesh restoration alone, and both lower cost and better efficiency than 1+1 dedicated protection alone.

The present invention teaches improved use of optical bypass in a carrier network using mesh restoration. This problem is quite broad in scope, and for clarity a number of simplifying assumptions are made. First, we restrict our attention to failure-independent path mesh design, which does not rely on fault isolation and requires that the working and restoration paths to be disjoint. This type of mesh restoration is not as efficient as other types of mesh, but is fast and compatible with the path protection mechanisms proposed for IP routers. We recognize that jointly optimizing the routing of working and restoration paths offers some improvement in network 10 cost, but the current assumption allowed us to hold the working design constant and focus on the differences for several designs in the cost of the spare bandwidth (required for the protect paths) for different amounts of optical bypass. More importantly, a failure-independent path mesh allows the working traffic to take full advantage of optical bypass, and in the case of optical bypass at all tandem nodes, includes 1+1 or 1:1 dedicated protection.

We also focus on the restoration of OC-192 paths, rather than the original STS-N demands. These OC-192s are the result of the first-and-last grooming of STS-N demands. This assumption allows for the use of any edge OXC that can switch OC-192s, including edge OOO and OEO OXCs. Transponders are assumed to terminate a WDM wavelength that needs to be connected to an OXC port for switching. Each OC-192 is routed on the shortest path for which a disjoint protect path exists. We use the same set of OC-192s for all of the restoration designs, to simply design comparisons.

In network studies where bandwidth efficiency is minimized, the optimal design causes restoration paths to pass through the OXC at almost all of the tandem nodes on the path. Depending on the reach of the transmission system, it is often possible to reduce the cost of the network by introducing additional optical bypass on the restoration paths. In all designs, we minimize network cost, which is a function of OXC interfaces, WDM transponder interfaces, and OEO regenerators, assumed here to have relative cost factors of 1, 2, and 3, respectively. The optical infrastructure (consisting of fiber plant, optical amplifiers, DWDM terminals, and OADM and OS where used) is considered a sunk cost, but to promotes shorter restoration paths, its use is taken in account by assigning a relatively small cost to the wavelength channel-kilometers (ch-km) used in the network. In the results, the costs of only the OC-192s used for restoration or protection are reported, since the equipment use and fiber routing of the working OC-192s is the same in all of the designs.

The degradation in bandwidth efficiency is minor compared to the cost savings with a significant use of optical bypass on the restoration paths. This bypass is achieved through a combination of partial express of some restoration paths and full express (i.e. dedicated protection) on others.

The spare capacity and restoration path design was performed with a heuristic algorithm, which used multiple demand orderings and a variety of post-optimization techniques. We have benchmarked this algorithm against a number of published results and our heuristic algorithm gives comparable results to the best heuristics, and within 4%-10% of the optimal design found through a branch-and-bound technique. From our experience with heuristic techniques for mesh network optimization, we find it difficult to compare heuristic optimization techniques without a rich set of reference networks, complete with demand and topology data. Indeed, our results here show that the restoration design efficiency can be significantly improved if the set of demands is modified appropriately. For example, in Topology A with 1500 km optical reach, when the network cost is reduced by moving some demands from shared mesh restoration to dedicated protection, the mesh restoration efficiency (measured in spare-to-working channel-km) changes from 1.02 to 0.62 for the demands remaining in the mesh restoration design. The efficiency changes for the entire set of designs are given in the table below, where each entry in Table 1 is (original efficiency, percentage of demands moved to dedicated protection, remaining mesh efficiency).

TABLE 1

|  | 500 | 1000 | 1500 | 2000 | 2500 | 3000 |
|---|---|---|---|---|---|---|
| Topology A | (1.01, 9%, 0.84) | (1.01, 20%, 0.67) | (1.02, 22%, 0.62) | (1.02, 22%, 0.63) | (1.02, 21%, 0.63) | (1.02, 21%, 0.62) |
| Topology B | (1.03, 5%, 0.89) | (1.06, 5%, 0.93) | (1.05, 7%, 0.90) | (1.05, 10%, 0.86) | (1.05, 12%, 0.80) | (1.09, 11%, 0.85) |
| Topology C | (1.10, 6%, 0.93) | (1.09, 3%, 1.01) | (1.13, 9%, 0.94) | (1.10, 10%, 0.95) | (1.10, 10%, 0.92) | (1.13, 13%, 0.89) |

Fundamental to the conceptual understanding of bypass in mesh restoration is the separation of the OXC topology from the underlying fiber topology. By using optical bypass or regeneration at tandem (fiber topology) nodes, a link in the OXC topology may be established between any pair of OXC sites in the network.

Adding express links increases the connectivity of the OXC topology, but it is not true that the efficiency of the restoration system improves. As more express links are added, a single fiber cut in the fiber topology will affect more links in the OXC topology. Our heuristic algorithm takes these multiple OXC topology link failures into account, and all of our designs provide 100% restoration for any single fiber cut. A good choice of OXC topology can force the heuristic design algorithm to use a significant amount of bypass without degrading the network efficiency significantly. Depending on the type of heuristic, too much connectivity in the OXC topology can result in worse designs.

We explore the impact of OXC topology connectivity on the optimal amount of bypass by introducing the notion of a chain of OXC topologies. Beginning with an OXC topology (A) identical to the fiber topology depicted in FIG. 1, we add a set of express links to form the next topology (B) in the chain. Each successive topology is more connected than the previous one, and this process of adding a new topology to the chain can be repeated finitely many times. In our study, we examine a chain composed of three topologies. The characteristics of these topologies are given in table 2.

TABLE 2

|  | Topology A | Topology B | Topology C |
|---|---|---|---|
| Nodes | 26 | 26 | 26 |
| Links | 32 | 51 | 60 |
| Average Degree | 2.46 | 3.92 | 4.62 |
| OC-192 Demands | 115 | 115 | 115 |
| Working Ch-Links | 272 | 175 | 165 |
| Working Ch-Km | 181956 | 181956 | 181956 |

As more links are added to a topology, the average node degree increases and the hop count of working paths decreases, as express links are always used for working traffic when available. It should be noted that the working path in the OXC topology can be changed without affecting the failure-independent mesh restoration design, as long as the traffic's routing in the fiber topology remains the same. Flexibility vs. cost must be considered in deciding how much optical bypass should be used for working traffic, without necessarily causing changes in the restoration design.

Given the set of OC-192 paths (in the fiber topology), we perform a mesh restoration design for each OXC topology in the chain. For a given OXC topology, each OC-192 fiber path is pulled back to the least hop path in the OXC topology which follows the same fiber path. The heuristic produces a restoration path for each OC-192 and determines the spare OC-192 bandwidth required on each link in the OXC topology.

The optical reach of the transmission system determines the number of regenerators needed for each link in the OXC topology, and hence the cost of the links are a function of the optical reach. We perform the mesh restoration design for each OXC topology for optical reach values of 500 km, 1000 km, 1500 km, 2000 km, 2500 km, and 3000 km, and report the cost of each design relative to the reference network, the shared mesh design with topology A and 500 km optical reach, which is assigned a cost of 100.

For the OXC topology A, the cost of the network decreases as optical reach grows from 500 km to 2000 km, but no further reduction occurs with greater reach. Because no optical bypass is used, the longest link in the fiber topology limits the benefits of ultra-long optical reach. For topologies B and C, which have some express links, there is small additional cost reduction as the optical reach grows from 2000 km to 3000 km.

Figure 7:
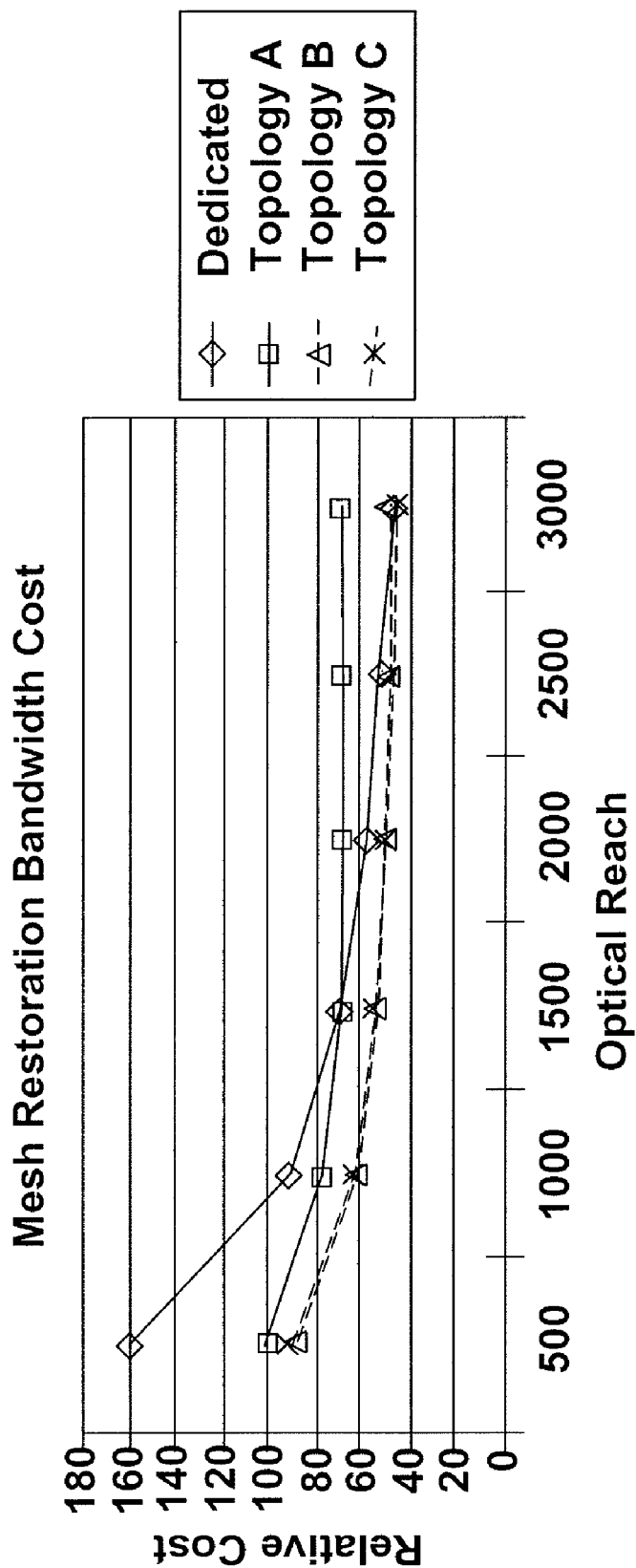
FIG. 7 shows a network cost for mesh restoration optimized for optical reach.

The cost of using 100% dedicated protection is also shown here, where optical bypass is used at every tandem node on the protection path. FIG. 7 illustrates advantages of using dedicated protection alone in networks with optical reach of at least 2000 km, if bandwidth efficiency is not an important consideration.

After each mesh restoration design, we identified the OC-192s which could migrate from the mesh to 1+1 protection and reduce the cost of the total network.

We plot the resulting spare bandwidth costs, focusing on the range of costs between 40% and 100% of the reference network cost.

Figure 8:
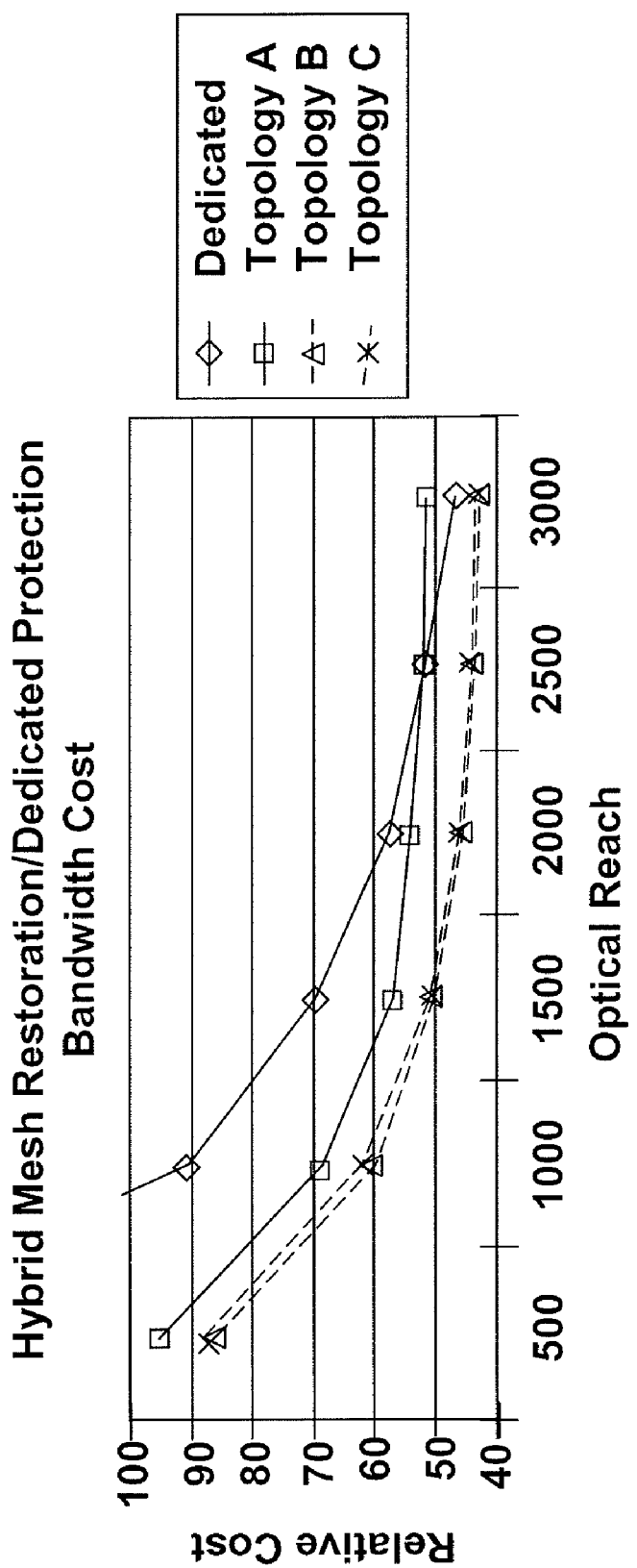
FIG. 8 shows a hybrid network cost optimized for optical reach.
Figure 9:
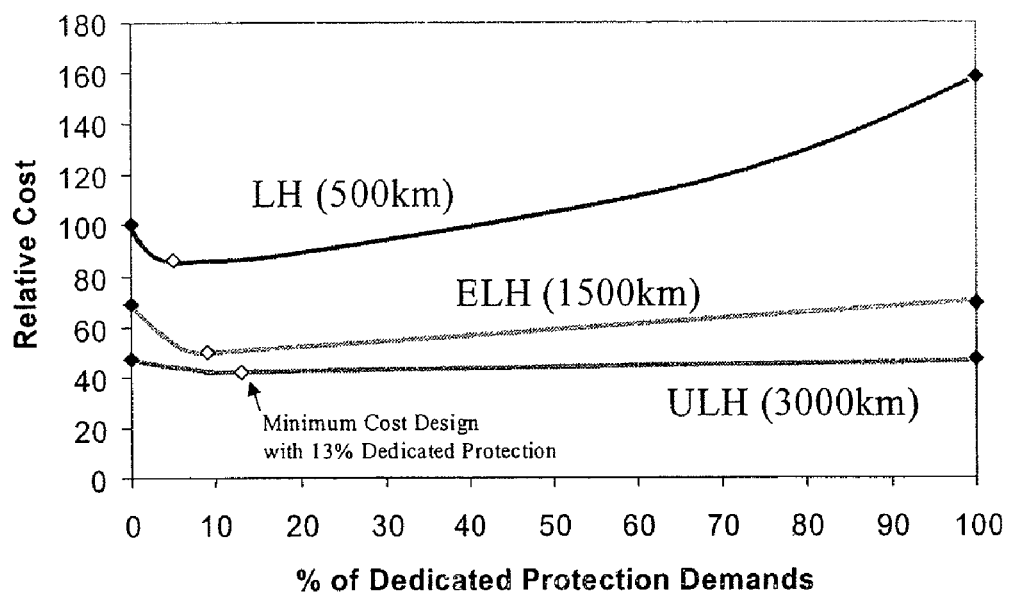
FIG. 9 shows a network cost as a function of percentage of dedicated protection.

As in FIG. 7, FIG. 8 shows that topologies B and C produce the lowest cost hybrid networks for all values of optical reach. In this case, however, dedicated protection alone is not competitive with the hybrid designs unless the optical reach exceeds 3000 km. The optimal mix is depicted in FIG. 9, for optical reach of 500 km, 1500 km, and 3000 km.

For LH optical reach, it is not surprising that the shared mesh restoration is more cost-effective than dedicated protection. With ELH systems, both mesh restoration and dedicated protection designs have approximately the same cost, with the hybrid design (with 9% dedicated protection) is 27% cheaper than either of them. Further cost reduction may be achieved by using an optimal mix of LH, ELH, and ULH transmission technologies in the hybrid designs. By testing such a design against different OXC topologies, it is possible to find optimal combinations of OXC topology, protection/restoration, and transmission technologies. Finally, we find that ULH provides great flexibility in choosing the percentage of demands to assign to dedicated protection, since this percentage does not strongly affect the network cost.

The lowest cost design, the hybrid design for topology C with 3000 km optical reach, consists of 87% of demands using mesh restoration and 13% using dedicated protection. This design is very efficient in its use of OXC interfaces. By computing the difference between the number of OXC interfaces in the design and the number of OXC interfaces in the pure dedicated protection design, then dividing by the number of OXC interfaces in the dedicated protection design, we find a relative measure of the additional OXC interfaces (and WDM transponders) needed to achieve the sharing of spare bandwidth. For the reference network, there are 266 additional interfaces and the relative measure is 1.16. For the lowest cost network, only 48 are needed, a reduction of 82%, and the relative measure is 0.21. For comparison purposes, both shared protection rings with ideal traffic loading and dedicated protection designs have a relative measure of 0.

Figure 10:
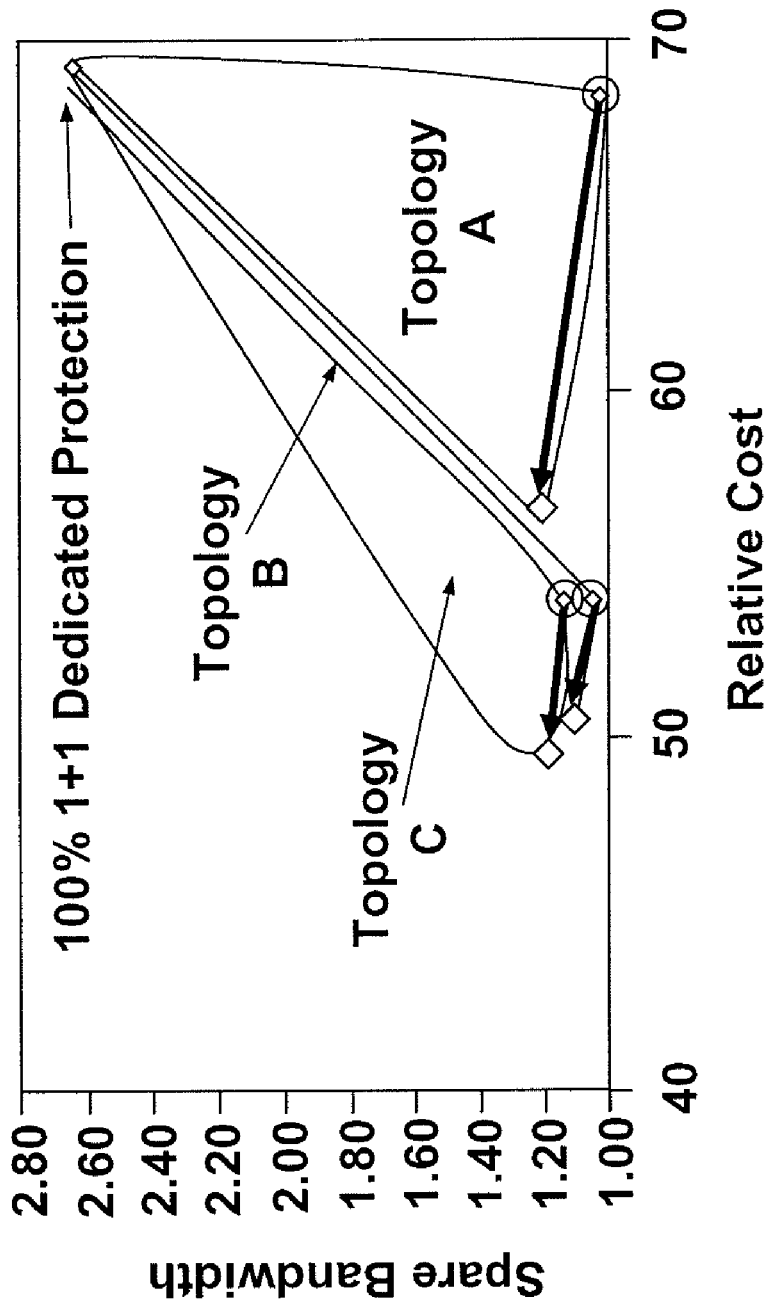
FIG. 10 shows an impact of optical bypass and dedicated protection on ELH-based mesh restoration.

We also examine the tradeoff between bandwidth efficiency and network cost. In FIG. 10, the designs for 1500 km optical reach are shown for all three OXC topologies. For each topology, a region is drawn to connect the data points representing 100% dedicated protection, shared mesh restoration, and hybrid designs. The arrow in each topology region shows the change in cost and efficiency by migrating an optimal set of demands from the mesh to dedicated protection. For example, the shared mesh design for topology A has approximately the same cost as the dedicated protection design. Both designs, with 1500 km optical reach, are about 68% of the cost of the reference network, the topology A design with 500 km reach. The arrow for topology A shows that the hybrid design significantly reduces network cost, with little increase in spare bandwidth, when 22% of the demands are migrated to dedicated protection.

The region for topology A represents the application of optical bypass as post-optimization of a mesh restoration design with no optical bypass. Better network designs can be found by starting with an expressed topology, such as topology B or C, and then perform post-optimization to migrate demands to dedicated protection.

Figure 11:
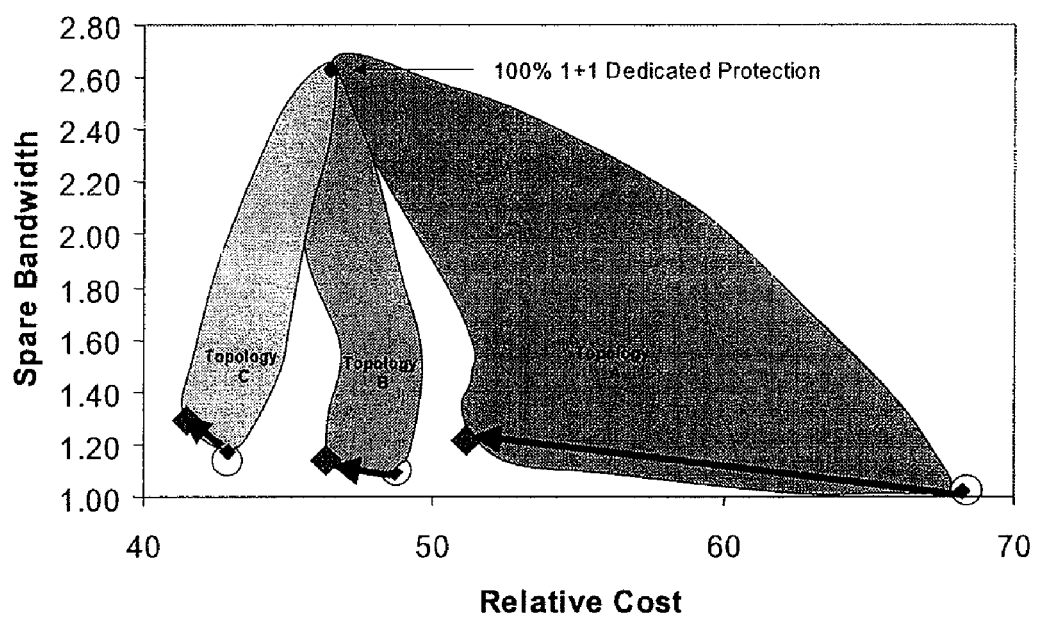
FIG. 11 shows an impact of optical bypass and dedicated protection on ELH-based mesh restoration.

With optical reach of 3000 km, depicted in FIG. 11, the cost of dedicated protection design has decreased to about 47% of the reference network cost. This is superior (in cost) to any of the designs using topology A. The topology C design with 87% shared mesh and 13% of the demands using dedicated protection is 10% cheaper and much more efficient than the dedicated protection design. It costs only 42% of the reference network cost.

The present invention is also directed to a network element of optical processing node that combines the cost efficiency of optical bypass and the flexibility and granularity of a grooming cross-connect. Mesh transmission networks that are currently deployed consist of point-to-point static DWDM links and grooming cross connects. A unified network platform combining long-haul (LH), extended long-haul (ELH), ultra-long-haul (ULH) transport, transparent optical switching and sub-wavelength grooming/switching offers a cost effective alternative. As the DWDM sub-system (LH, ELH, ULH and transparent optical switching) becomes dynamic, a unified control plane is required to manage connections in both grooming cross-connect tier and DWDM tier.

Figure 12:
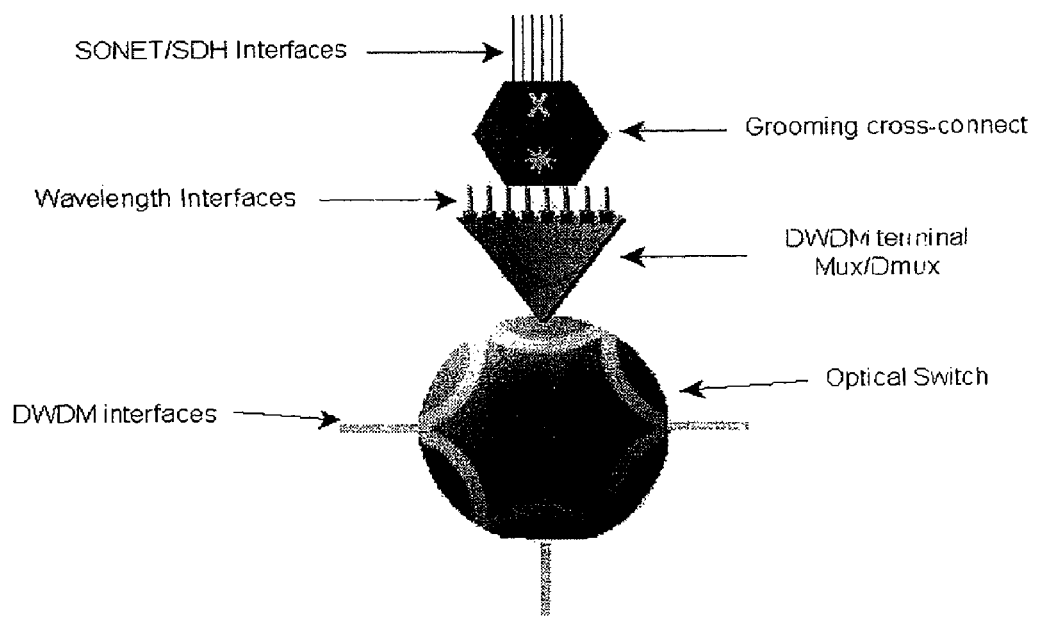
FIG. 12 shows the nodal architecture of a unified network platform.

The nodal architecture of the unified network platform is shown in FIG. 12. The first component of the unified network platform is a grooming cross-connect. This sub-system is a SONET/SDH capable device. It typically supports interfaces ranging from OC-3/STM-1 to OC-192/STM-64 and establishes cross-connections at STS-1/VC-4 granularity.

The second component of the unified network platform is the DWDM terminal. It maps short reach signals into long haul (LH), extended long haul (ELH) or ultra-long haul (ULH) wavelengths. The short reach signal can be SONET/SDH framed, such as an OC-192/STM-64 signal. The control plane, however, is capable of supporting other types of signals, for example a Gigabit Ethernet or 10 Gigabit Ethernet.

The third component of the unified network platform is the optical switch (OS). This sub-system is responsible for establishing dynamic optical by-pass. In essence, the optical switch is capable of directing an incoming wavelength to any of its ports. This being done without OEO transponders, resulting in cost savings. It shall be noted that the optical switch is a generalization of an optical add/drop multiplexer (OADM).

Next generation transmission network based on unified network platforms is likely to be deployed in a mesh topology to ensure maximum flexibility. Two logical tiers can be identified. The first one, the grooming cross-connect tier supports and manages sub-wavelength connections. The second tier, the DWDM tier is comprised of DWDM terminals and optical switches. This tier supports and manages wavelength level services. It also provides the grooming cross-connect tier with mesh connectivity that interconnects the grooming sub-systems together.

Figure 13:
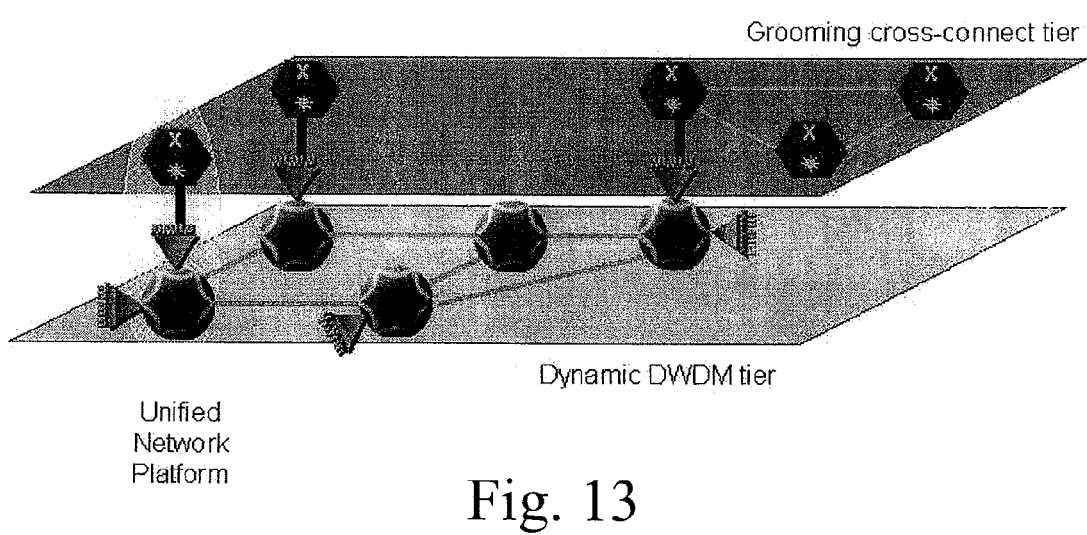
FIG. 13 shows a network model of a unified control plane.

FIG. 13 shows an example of the mesh unified network model. As shown in FIG. 13, some sites do not accommodate the grooming cross-connect sub-system. These sites may only offer wavelength services. Some other sites only support the grooming cross-connect sub-system. They will be connected through existing transmission equipment. Typically, point-to-point DWDM transmission systems. When more traffic is required an easy upgrade path would allow for the addition of an optical switch integrated with the grooming cross connect.

In the context of GMPLS, the IETF has defined a hierarchy for Label Switch Router's (LSR) interfaces:

Interfaces that can identify packets or cells in a signal and forward these cells and packets based on their header content are classified as packet switch capable.

Interfaces that can forward traffic based on the traffic's position in a time slot. These interfaces are classified as TDM capable.

Interfaces that can forward traffic based on the wavelength on which the traffic is received are classified as lambda switch capable. Interfaces that can forward traffic based on the group of wavelength on which the traffic is received are classified as waveband switch capable. Interfaces that can forward traffic based on the traffic's position in the real world physical space are classified as fiber switch capable.

Network elements belongs to one or more of these hierarchical levels. Elements belonging to different levels may inter-act through the creation of forwarding adjacencies. For example, a TDM capable device may trigger the creation of a wavelength level connection over a DWDM network. From the TDM level, the wavelength connection will be viewed as a forwarding adjacency, which means that the wavelength connection will be advertised within the TDM routing domain as a new link.

The unified control plane involves two types of sub-systems. The grooming cross-connect sub-system supports TDM capable interfaces, while the optical switch sub-system supports lambda switch capable interfaces.

Figure 14:
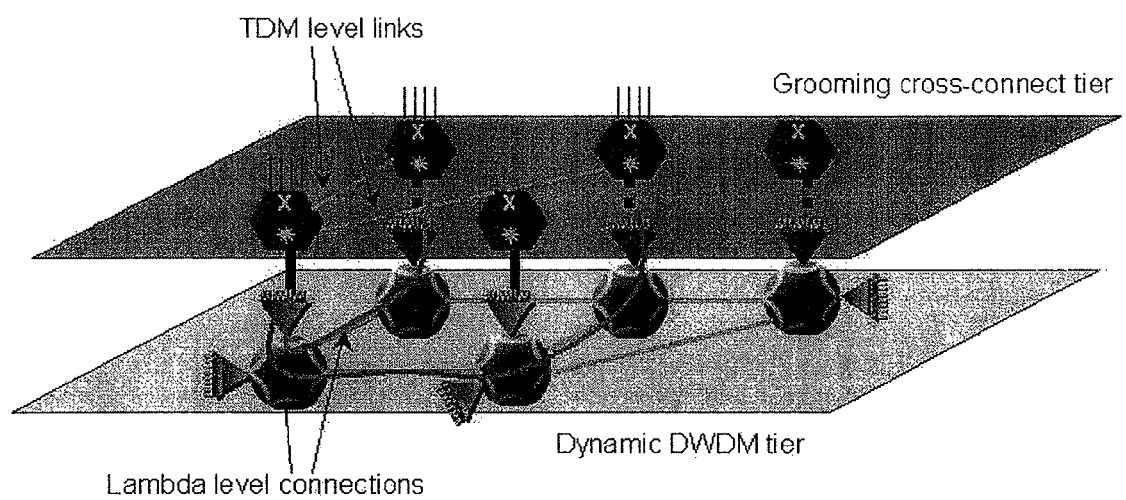
FIG. 14 shows a connection hierarchy in the context of the unified control plane.
Figure 15:
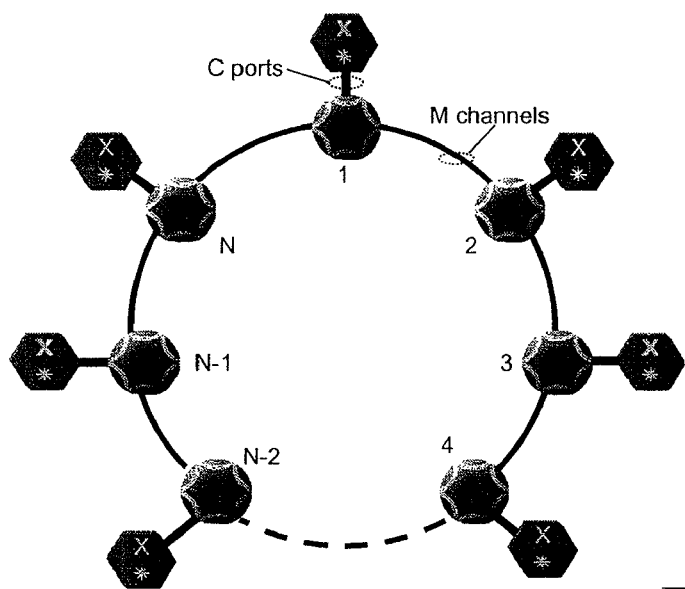
FIG. 15 shows a network model.

The concept of forwarding adjacency applies. As depicted in FIG. 14, two wavelength connections have been established and are advertised in the grooming cross-connect tier as two links. Over those links, sub-wavelength connections may be established when needed.

The Control Plane can be generally defined by the functions it performs: topology information acquisition, representation, and dissemination, as well as decision making (e.g., path selection) and action invocation (e.g., signaling).

A control plane for the grooming cross-connect tier is fairly well understood and described in numerous publications. The implementation of a control plane for the dynamic DWDM tier is not as widely described. As stated in the definition, the control plane shall disseminate enough information to allow for path selection. Assuming that path selection is distributed, the path selection scheme in the DWDM tier dictates the amount and nature of information that needs to be disseminated by the control plane. Once the path selection is complete, the connection can be established through signaling.

Selecting a path in the DWDM tier typically involves the following:

For every link between two optical switches, the signal degradation is calculated. Signal degradation parameters include dispersion and OSNR. It will be calculated based on a number of static factors such as link span, optical amplifier spacing and fiber type.

Each optical switch also add degradation (node degradation) when traversed

Since the optical switch is a purely transparent device with no OEO conversion and no regeneration, for every path between two nodes, signal degradation is accumulated which includes link as well as node degradation.

The path determination algorithm shall also ensure that the same wavelength is used between termination and regeneration point and between two regeneration point.

When some level of signal degradation gets accumulated, then signal regeneration is needed.

When no end-to-end wavelength is available, then wavelength conversion is needed.

Based on regeneration and termination cost, an overall cost can be assigned to the potential paths Based on this path selection scheme, if the DWDM tier were to be represented by a link state protocol such as OSPF-TE or IS-IS-TE, the link description shall include the following:

OSNR

Dispersion

Available wavelength (discrete list of all available wavelength on a link)

The node description shall include:

Node degradation

Regeneration/Wavelength conversion capability

Signaling the establishment/tear-down/modification of a wavelength connection, requires little change to already existing signaling protocols such as RSVP-TE and CR-LDP. In order to enforce wavelength continuity, the suggested label object shall be supported and enforced strictly.

A key to network efficiency is the choice in the wavelengths that are established over the DWDM tier. As SONET/SDH connections (sub-wavelength connections) are added to the network, the underlying DWDM connections may be modified to better accommodate the traffic. As the demand distribution of SONET/SDH connections (sub-wavelength connections) changes, the DWDM connectivity may be modified to accommodate the new traffic pattern. The next section makes the case for the benefits of a re-configurable DWDM tier. It also discusses a policy for triggering the reconfiguration of the DWDM tier.

From a control plane perspective, the modification of the DWDM connections represents a change in the forwarding adjacencies topology. Management of the forwarding adjacencies can be implemented outside the control plane. This would be performed by a traffic engineering server. It would monitor the SONET/SDH connections (sub-wavelength connections) over the network. The server would also have visibility over the DWDM tier resources. It would then be able to trigger the creation/deletion/modification of forwarding adjacencies based on the sub-wavelength traffic distribution and the resources available at the DWDM tier.

The management of forwarding adjacencies can also be implemented within the control plane. Based on some distributed policies, the grooming cross-connect subsystem would be able to request the creation/deletion/modification of DWDM connections. A User to Network Interface would be used to signal creation/deletion of DWDM connections. Since a client/server model is used, the grooming cross-connect sub-system would have no knowledge of the DWDM tier state, which may result in sub-optimal network configurations. On the other hand, a Network to Network Interface would provide visibility into the DWDM tier state and would result in more optimized network configurations.

A unified control plane between a grooming cross-connect tier and an dynamic DWDM tier enables dynamic reconfigurability of forwarding adjacencies (or logical topology) among the grooming cross-connects. The following is an analysis of the capacity efficiency of this dynamic reconfigurability. In particular, we will show that for a given network capacity, which could be expressed in terms of the deployed DWDM capacity and the capacity of the grooming cross-connects at the edge, a larger set of traffic demands can be accommodated when allowing for reconfigurability than it is using one static configuration. We also quantify this capacity efficiency for a particular network model. In addition, as a byproduct of the analysis, we present a method for monitoring the network state and triggering network reconfigurability.

The network model used in this analysis is the one shown in FIG. 4 where the physical topology in the all-optical tier is a ring with N optical switches and a capacity of M channels (or wavelengths) per link. Each grooming cross-connect has a total of C ports attached to the optical switch, the port capacity (equal to per-wavelength channel capacity) is OC-x with a typical value of x being 192, and 768 is emerging. The sub-wavelength demands (STS-n for n=1, 2, . . . , 192 or 768) are groomed in the cross-connect tier whose logical topology depends on the configuration of the all-optical tier.

In this network of N nodes, there are N(N−1)/2 different node-pairs with potential traffic demands between them. For every node-pair, let h denote its hop-count defined as the minimum number of links on the physical ring topology. The node-pair will be referred to as h-hop node pair and traffic between the node pair as h-hop traffic. We will assume without loss of generality that the number of nodes N is odd, this gives us the convenience of unique shortest path along the ring since for N even there are two paths between h-hop node pairs when h=N/2, otherwise all the results in this section extend naturally to the case of N even. With N odd, the largest value of h is k=(N−1)/2, so that h takes values in the set $\{1, 2, \ldots, k\}$. For any given i=1, 2, . . . , k, there are N different node pairs with h=i for a total of N*k or N(N−1)/2 different node pairs in the network.

To simplify the analysis, we make the following uniform traffic assumption: for any given h, the aggregate capacity of all STS-n traffic demands between any of the N different h-hop node pairs in the network is the same, and is denoted $d_h$. In other words, there are k different traffic types in the network, and the network demand matrix is then described by the vector $D=[d_1 \ d_2 \ldots d_k]$.

Figure 16:
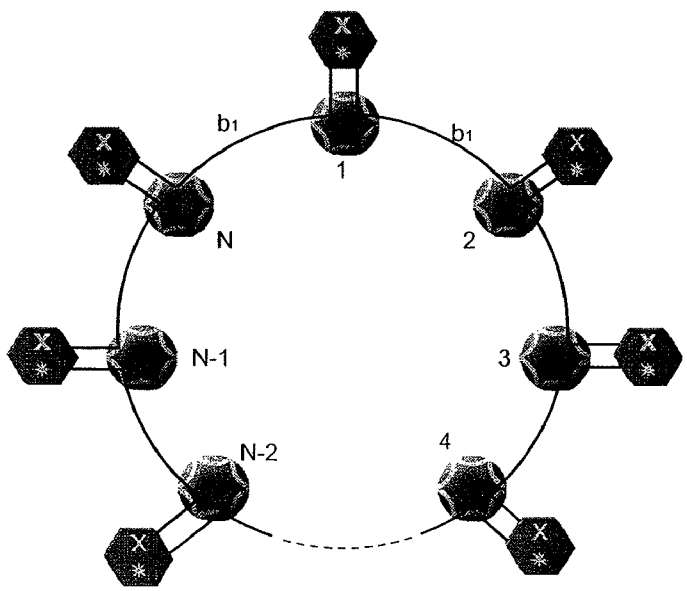
FIG. 16 shows a no-bypass topology.
Figure 17:
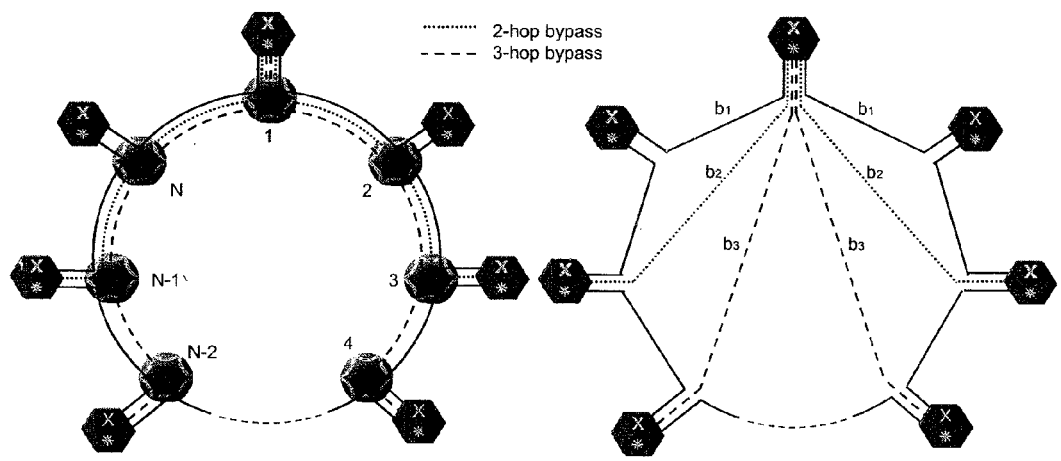
FIG. 17 shows a topology with two-hop and three-hop bypass.

The logical topology in the cross-connect tier depends on the configuration of the all-optical tier, in particular on the amount of all-optical bypass (or expressing) between the different cross-connect pairs. FIGS. 16 and 17 show different configurations: FIG. 16 has no bypass and because of the uniform traffic assumption each logical link has capacity $b_1$ up to C/2, FIG. 17 shows 2-hop and 3-hop bypass logical links (to simplify the figure these bypass links are shown from node 1 only, similar bypass links from other nodes are not shown). The amount of bypass capacity for each h-hop traffic is denoted $b_h$ for h=2, 3, . . . , k. Note that, when h=1, $b_1$ does not correspond to bypass per se (corresponds to capacity between adjacent nodes). Bypass capacity $b_h$ for h=2, 3, ..., k, is assumed to be used exclusively by the h-hop traffic whereas $b_1$ can be used by any h-hop traffic. Without bypass the h-hop traffic for any value of h is routed on the no-bypass topology of FIG. 5 and uses h logical links. When an h-hop bypass link is created as in FIG. 17, the h-hop traffic can now use this bypass link (which is a 1-hop logical link) instead of h 1-hop logical links on the no-bypass topology of FIG. 16. Note that whereas without bypass the number of channels (wavelengths) used on each physical link is $b_1$ (can take values up to C/2), with bypass it can be easily verified that the number of channels used is $b_1 + 2 b_2 + 3 b_3 + \ldots + k b_k$.

A network configuration is described by the bypass vector $B=[b_1 \; b_2 \; b_3 \; \ldots \; b_k]$ where $b_i$ is the port capacity assigned by each cross-connect to each one of its two i-hop bypass links. A traffic demand is described by the demand vector $D=[d_1 \; d_2 \; d_3 \; \ldots \; d_k]$ where $d_i$ is the aggregate demand for traffic between every i-hop node pair. This traffic is routed in the cross-connect logical topology on either i 1-hop links or on the bypass link if it exists.

We now try to characterize the set of feasible demands D for a given network configuration described by the vector B. A configuration B is feasible if the following cross-connect port capacity and fiber channel capacity constraints are satisfied.

$$b_1 + b_2 + b_3 + \ldots + b_k \leq C/2$$

$$b_1 + 2b_2 + 3b_3 + \ldots + kb_k \leq M \quad (1)$$

Let F(B) denote the set of feasible demands of configuration B. This is the set of all demands D that can be accommodated (or carried) by the network configuration having B as the bypass vector. A demand is feasible if it can be accommodated (or carried) by the network. In other words, there exists a configuration B such that D is in F(B).

For a given configuration B, the boundary of the set F(B) is given by the set of demands D satisfying $$d_1 + 2d_2 + 3d_3 + \ldots + kd_k = b_1 \quad (2)$$

and the transformation $$\begin{cases} d_1 = d_1 \\ d_2 = d_2 + b_2 \\ d_3 = d_3 + d_3 \\ \ldots \\ d_k = d_k + b_k \end{cases} \quad (3)$$

The demand vectors D that are solution of (2) are all the demands that can be routed on the 1-hop links (without any bypass). Equations (3) add to the solution of (2) the bypass components of the traffic: for each i-hop demand we add the bypass component $b_i$ to the non-bypass component derived from (2), except of course for $d_1$ which has no bypass component.

Figure 18:
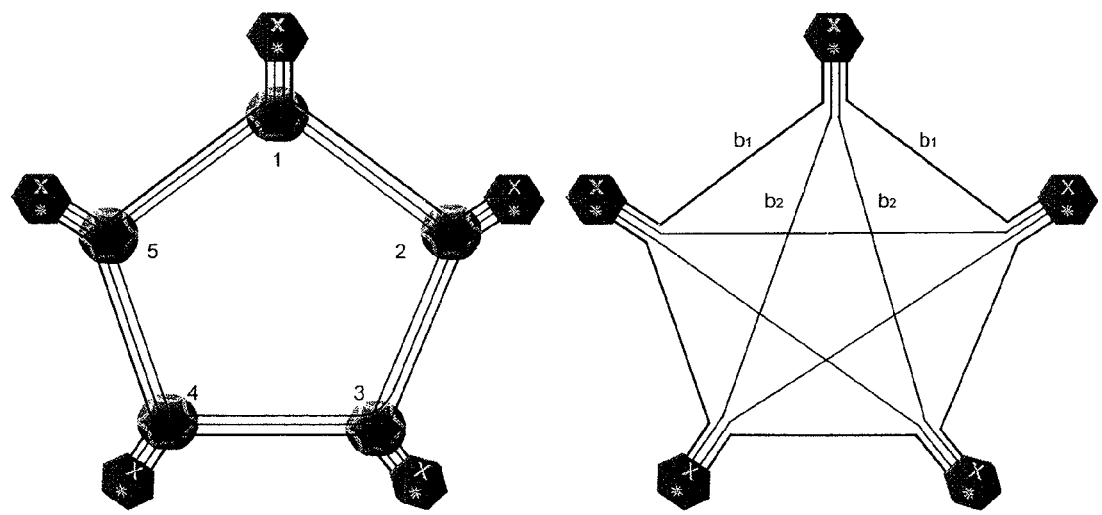
FIG. 18 shows a topology with five nodes.
Figure 19:
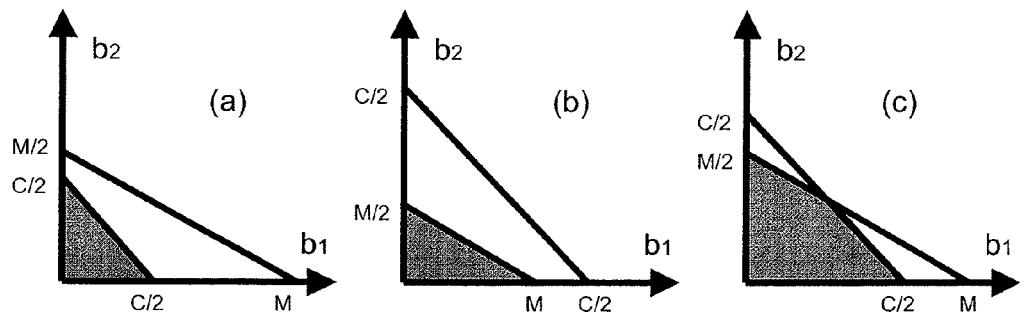
FIG. 19 shows a configuration feasibility constraints.

In order to further characterize F(B), we consider a 2-dimensional scenario which can be visualized in the 2-dimensional plane. The smallest topology with both 1-hop and 2-hop traffic is a 5-node topology as shown in FIG. 18. In this case the configuration is described by $B=[b_1 \; b_2]$ and the demands by the vector $D=[d_1 \; d_2]$. Depending on the cross-connect capacity C and the fiber channel capacity M, the configuration feasibility constraints (1) could result in one of these three cases as shown in FIG. 19:

when $M \geq C$, then the cross-connect port constraint is binding when $M \leq C/2$, then the fiber channel constraint is binding when $C/2 \leq M \leq C$, then both constraints are binding We will assume in this 5-node scenario that the cross-connect capacity constraint is binding as in case (a) which results in feasible configurations satisfying $0 \leq b_1 \leq C/2$ and $0 \leq b_2 \leq C/2 - b_1$. This assumes that the system has enough wavelengths and is constrained by the cross-connect capacity. Other binding constraints as in (b) and (c) can be easily captured and will result in different constraints on $b_1$ and $b_2$.

Figure 20:
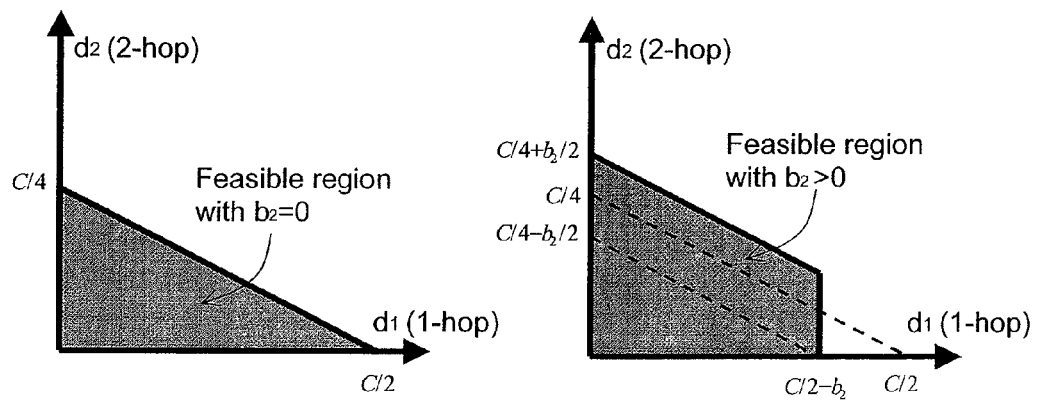
FIG. 20 shows a feasible region for two values of $b_2$.
Figure 21:
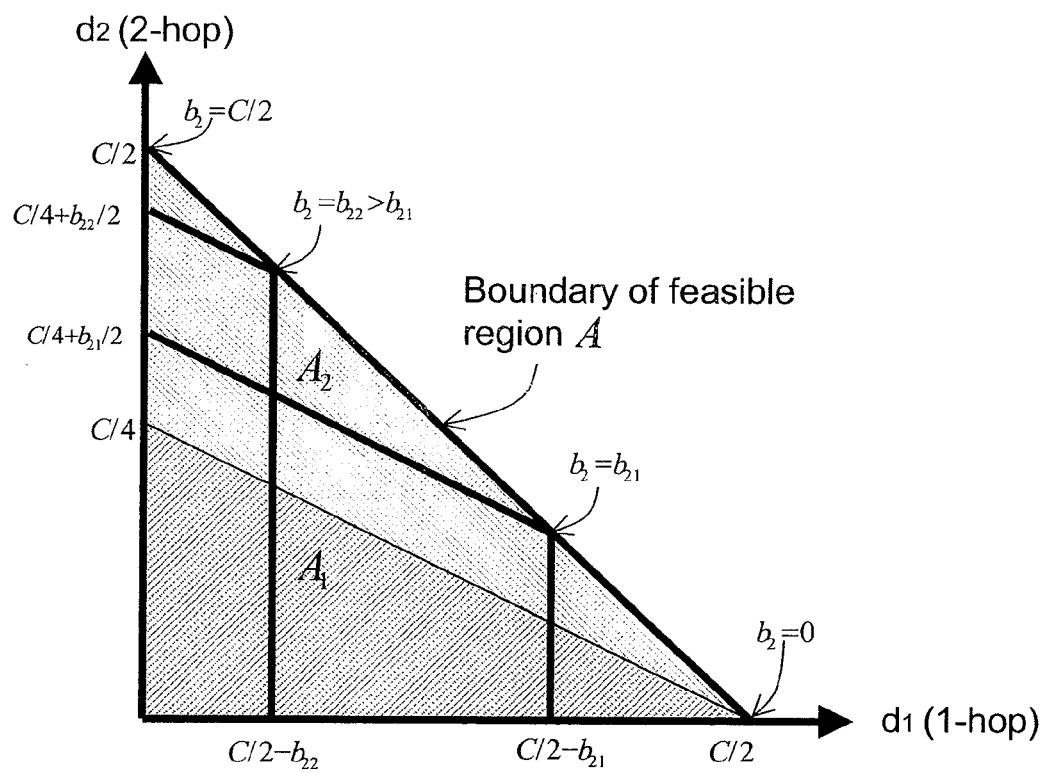
FIG. 21 shows a union of feasible regions.

In a full configuration ($b_1 + b_2 = C/2$), the feasible demand region is shown in FIG. 20 for both the no-bypass case with $b_2 = 0$ ($b_1 = C/2$) and the case with a bypass capacity $b_2 > 0$. FIG. 21 shows the feasible region for different network configurations corresponding to different values of $b_2$ ranging from 0 to C/2. This figure also shows the union A of all these feasible regions. It is made up of the area $A_1$ corresponding to all demands that can be accommodated by the no-bypass configuration (B=[C/2 0]) and the area $A_2$ enabled by reconfiguring the network through the introduction of bypass (B=[C/2-$b_2$ $b_2$] for 0<$b_2 \leq C/2$). By allowing for network reconfigurability, any demand within the feasible region A can be accommodated. Compared to the feasible region without bypass ($A_1$), the union A has twice as much area since $A_2$ has same area as $A_1$. Without reconfigurability, any demand within $A_2$ would have been blocked. With reconfigurability enabled, the network capacity as measured by the area of feasible demands is double, thus resulting in less demand blocking.

Figure 22:
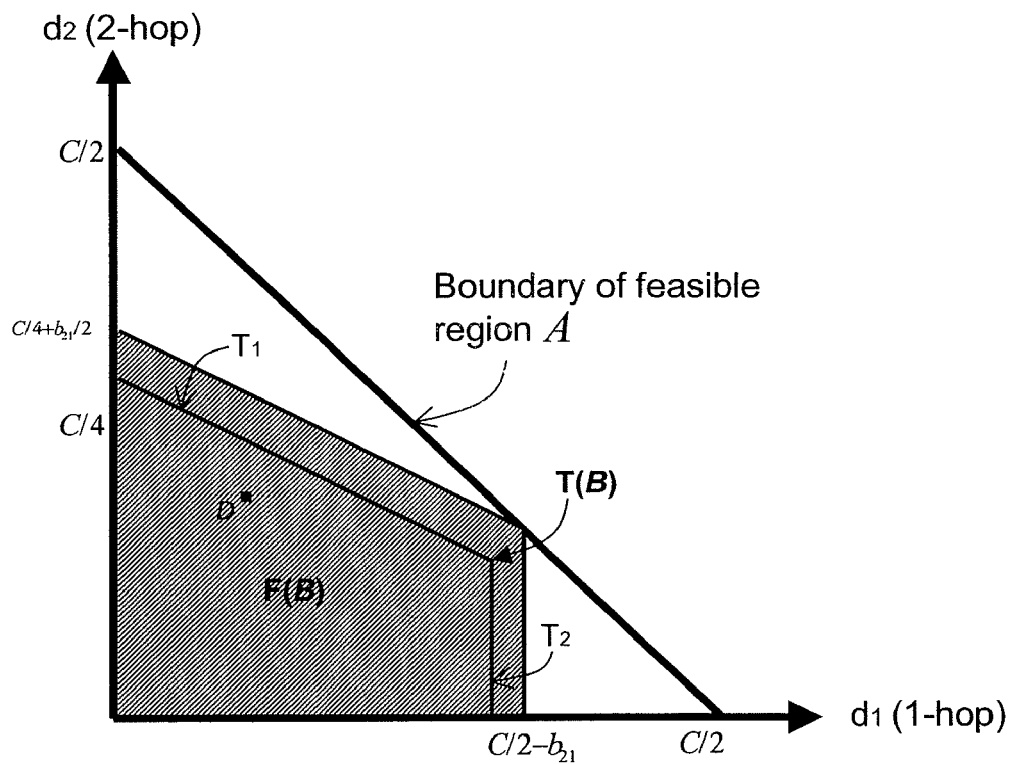
FIG. 22 shows threshold-based reconfiguration policy.

Implementing reconfigurability requires a policy for determining when to reconfigure the network and what new configuration to implement. An example of a threshold-based policy is shown in FIG. 22. This figure shows the current configuration with its feasible demand set F(B) and a threshold T(B) within F(B). The current network traffic demand vector D is given by a point in F(B). Any demand D outside of F(B) (but within A) can not be carried by the network without reconfiguring the network (demands outside of A are not feasible). As demands are setup and released the corresponding point D moves within F(B). When it reaches the threshold T(B) we trigger reconfigurability: it the boundary T1 is reached we implement a new configuration with more bypass capacity (higher $b_2$), if the boundary T2 is reached we move to a new configuration with less bypass (smaller $b_2$). Having T(B) strictly within F(B) allows for proactive reconfigurability, we can also operate in a reactive mode with T(B) being the boundary of F(B). In this case reconfigurability is triggered only at the time when it is required as opposed to anticipating changes in the traffic mix and proactively reconfiguring the network. In either case, changing $b_2$ (up or down) requires disabling some links in the cross-connect logical topology and enabling new ones. For instance, when $b_2$ is increased by one port capacity (which is accompanied by decreasing $b_1$ by 1 since the sum $b_1 + b_2$ is constant and equal to C/2) one component link will have to be disabled from all 1-hop links. This might require some bridge-and-roll operations if the 1-hop links are fragmented and need to be packed to free up a port worth of capacity. Once a 1-hop component link is freed up on all 1-hop links, all 2-hop bypass links are augmented with one unit of capacity. This is implemented through the unified control plane by setting up a wavelength in the all-optical tier between a pair of cross-connect ports for all 2-hop node pairs.

Those of ordinary skill in the art will appreciate that numerous modifications and variations that can be made to specific aspects of the present invention without departing from the scope of the present invention. It is intended that the foregoing specification and the following claims cover such modifications and variations.

The invention claimed is:

1. A method for transmitting optical signal traffic through an optical communications system including transmitters and receivers, including:
   transmitting traffic from the transmitters into a plurality of optical paths connecting the transmitters and receivers;
   passing a first portion of the traffic into a first node connecting at least two of the optical paths;
   wherein passing the first portion of the traffic through the first node comprises:
      passing the first portion of the traffic through a first optical switch in the first node;
      exiting the first portion of the traffic from the first node without undergoing an optical-electrical-optical conversion in the first node when the first portion of the traffic passing through the first node is not being dropped at the first node; and
      bypassing a first DWDM terminal in the first node;
   adding local traffic at the first node through a first cross-connect and the first DWDM terminal in the first node;
   dropping local traffic at the first node through a first cross-connect and the first DWDM terminal in the first node;
   passing a second portion of the traffic into a second node connecting at least two of the optical paths, wherein none of the second portion of the traffic entering the second node passes through a cross-connect in the second node;
   wherein passing the second portion of the traffic into the second node comprises:
      passing the second portion of the traffic through a second optical switch connected to the at least two optical paths connected to the second node; and
      passing the second portion of the traffic through a second DWDM terminal connected to the second optical switch; and
   receiving at least the first portion and the second portion of the traffic after the first portion and the second portion of the traffic passes through the first and second nodes.

2. The method of claim 1, further comprising passing at least one signal wavelength of the second portion of the traffic into and out of the second optical switch in the second node without undergoing an optical-electrical-optical conversion.

3. The method of claim 1, wherein passing the first portion of the traffic through the first node, passing the first portion of the traffic through a first optical switch in the first node, and exiting the first portion of the traffic from the first node without undergoing an optical-electrical-optical conversion in the first node when the first portion of the traffic passing through the first node is not being dropped at the first node includes bypassing a cross-connect in the first node.

4. The method of claim 1, wherein the first portion of the traffic and the second portion of the traffic are the same.

5. The method of claim 1, further comprising:
   passing a third portion of the traffic into a third node connected to at least two of the optical paths;
   passing the third portion of the traffic in the third node to a third switch;
   passing at least one signal wavelength of the third portion of the traffic from the third switch to a third DWDM terminal;
   performing an optical-electrical-optical conversion on the signal wavelengths passing to the third DWDM terminal;
   returning the signal wavelengths subjected to the optical-electrical-optical conversion to the third switch; and
   passing the signal wavelengths returned to the third switch out of the third node on one of the optical paths without dropping the signal wavelengths at the third node.

6. The method of claim 5, further comprising passing at least one signal wavelength of the third portion of the traffic into and out of the third switch in the third node without undergoing an optical-electrical-optical conversion.

7. The method of claim 5, wherein performing an optical-electrical-optical conversion includes passing the signal wavelengths passing to the third DWDM terminal through a cross-connect.

8. The method of claim 5, further comprising passing at least one signal wavelength of the third portion of the traffic into and out of the third switch in the third node includes bypassing a cross-connect in the third node.

9. The method of claim 5, wherein the first portion of the traffic, the second portion of the traffic, and the third portion of the traffic are the same.

* * * * *